United States Patent Office 3,221,214
Patented Nov. 30, 1965

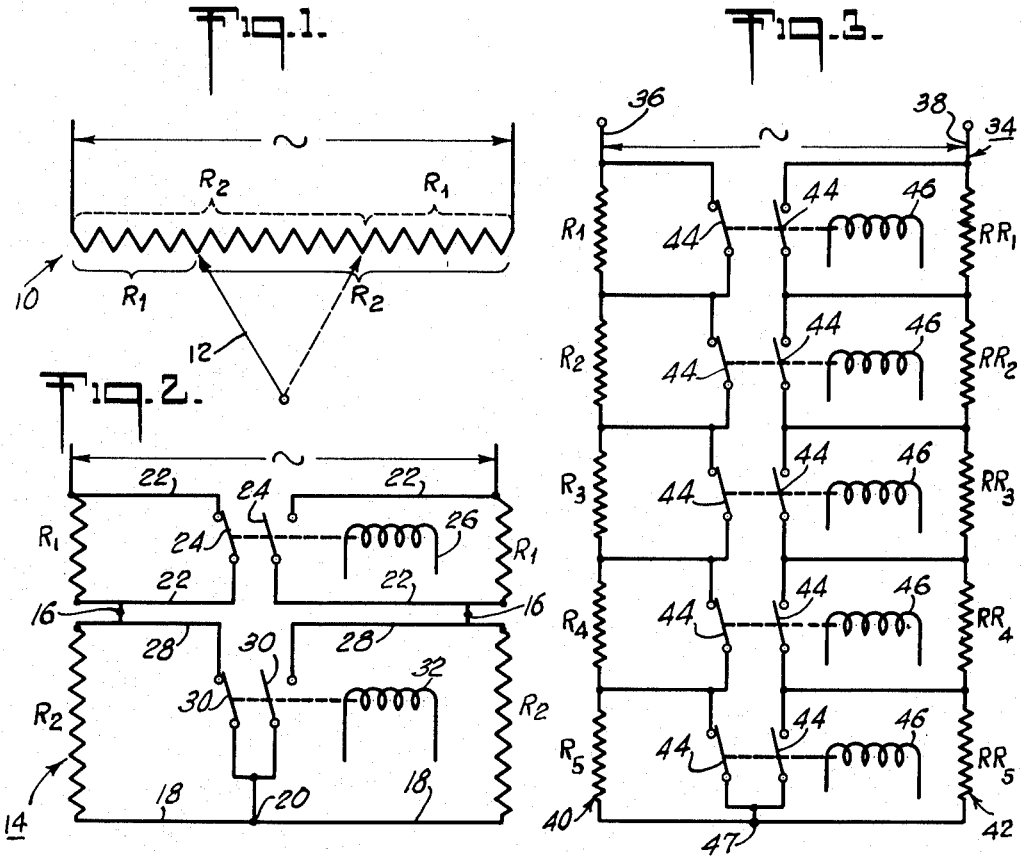
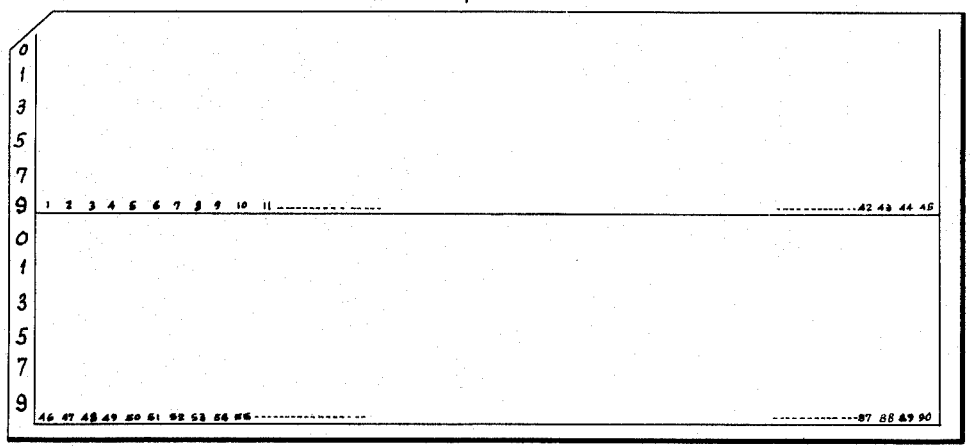

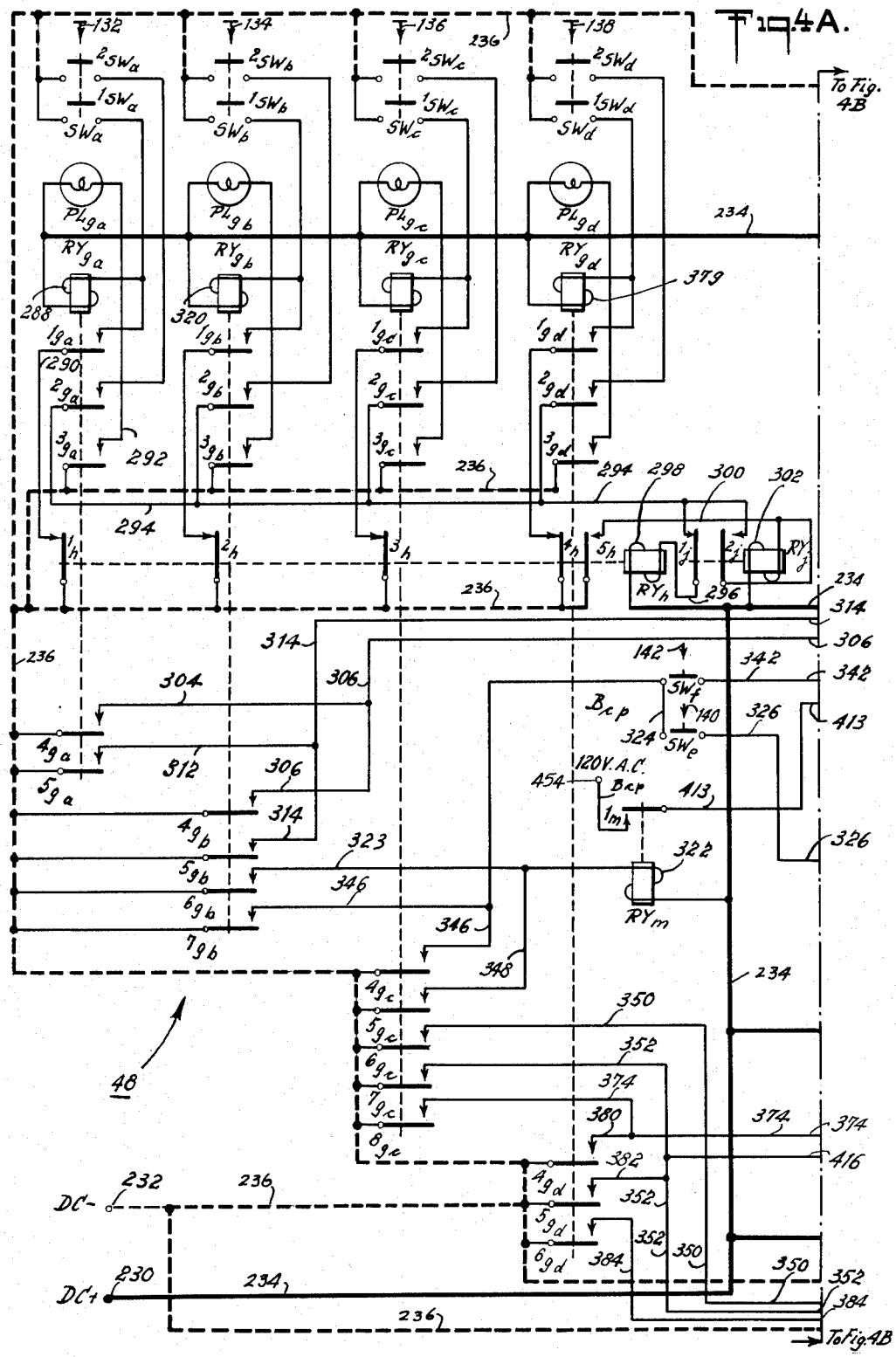

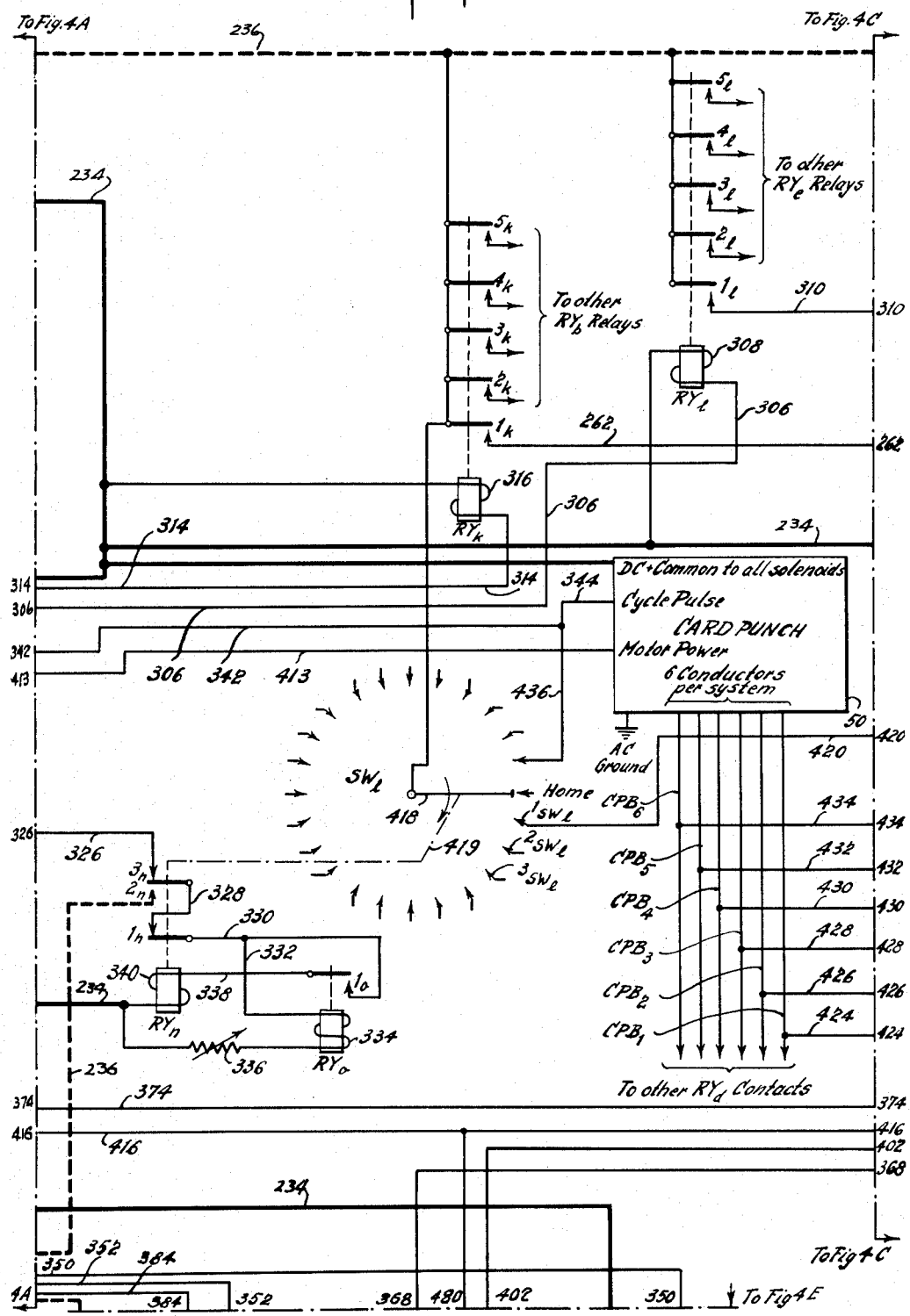

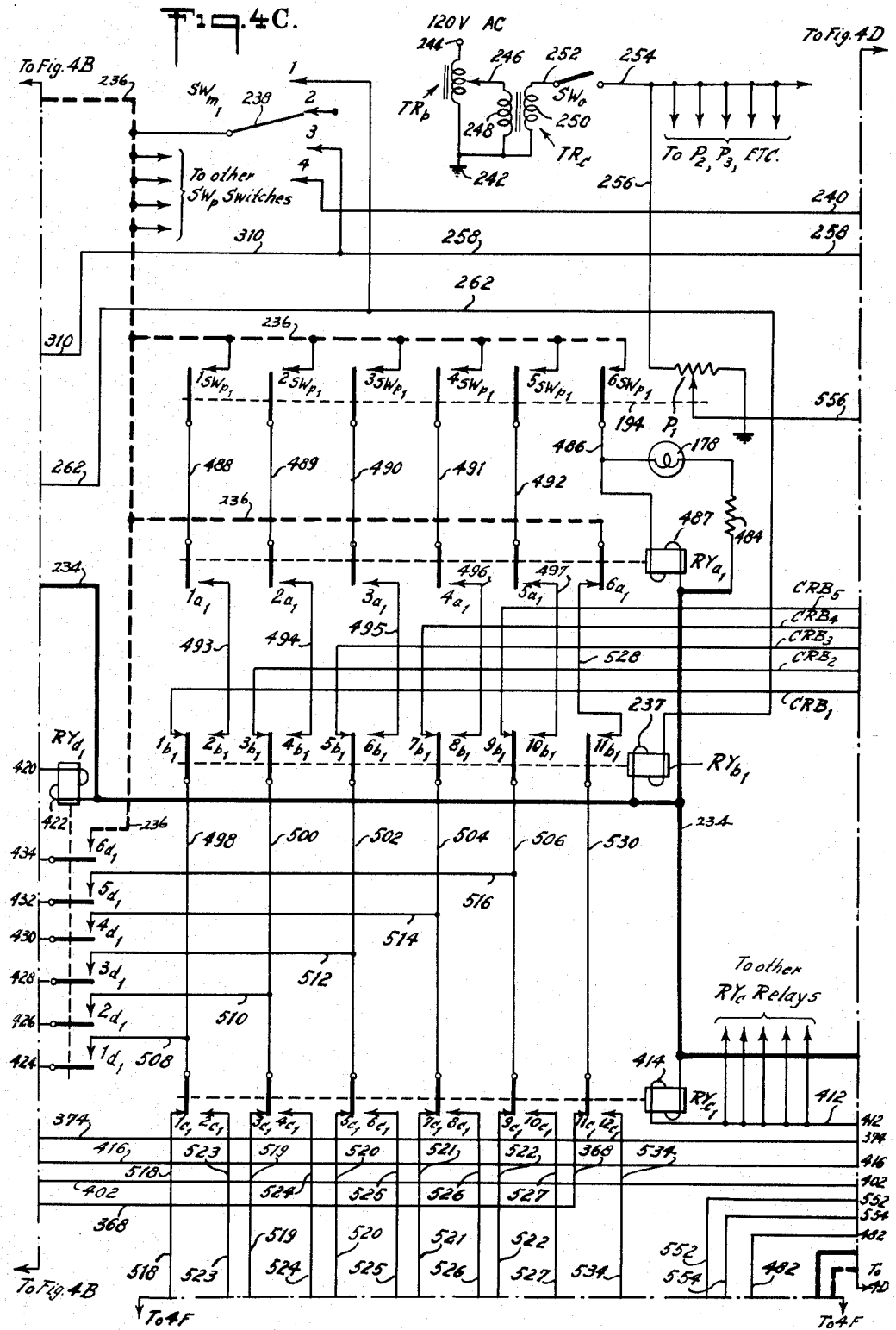

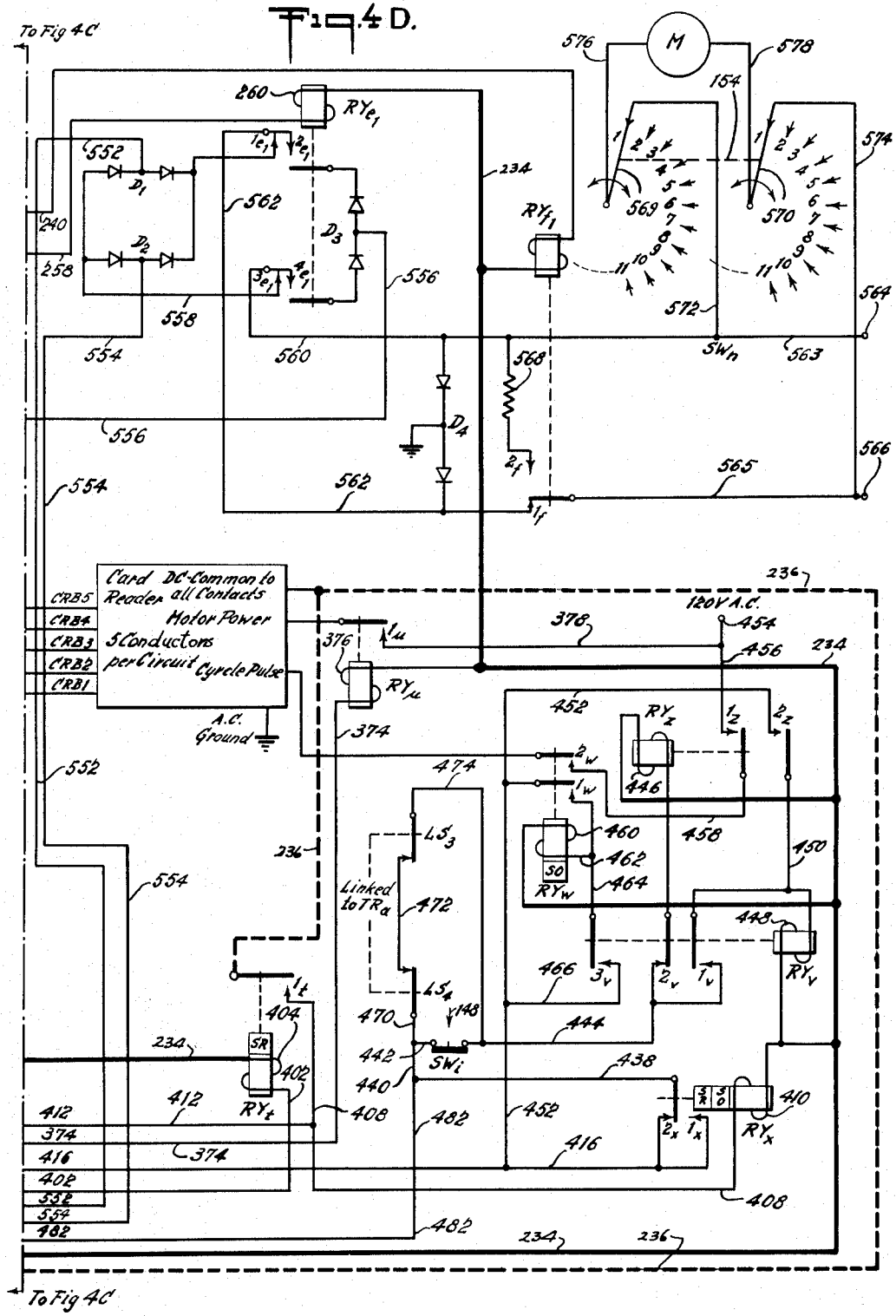

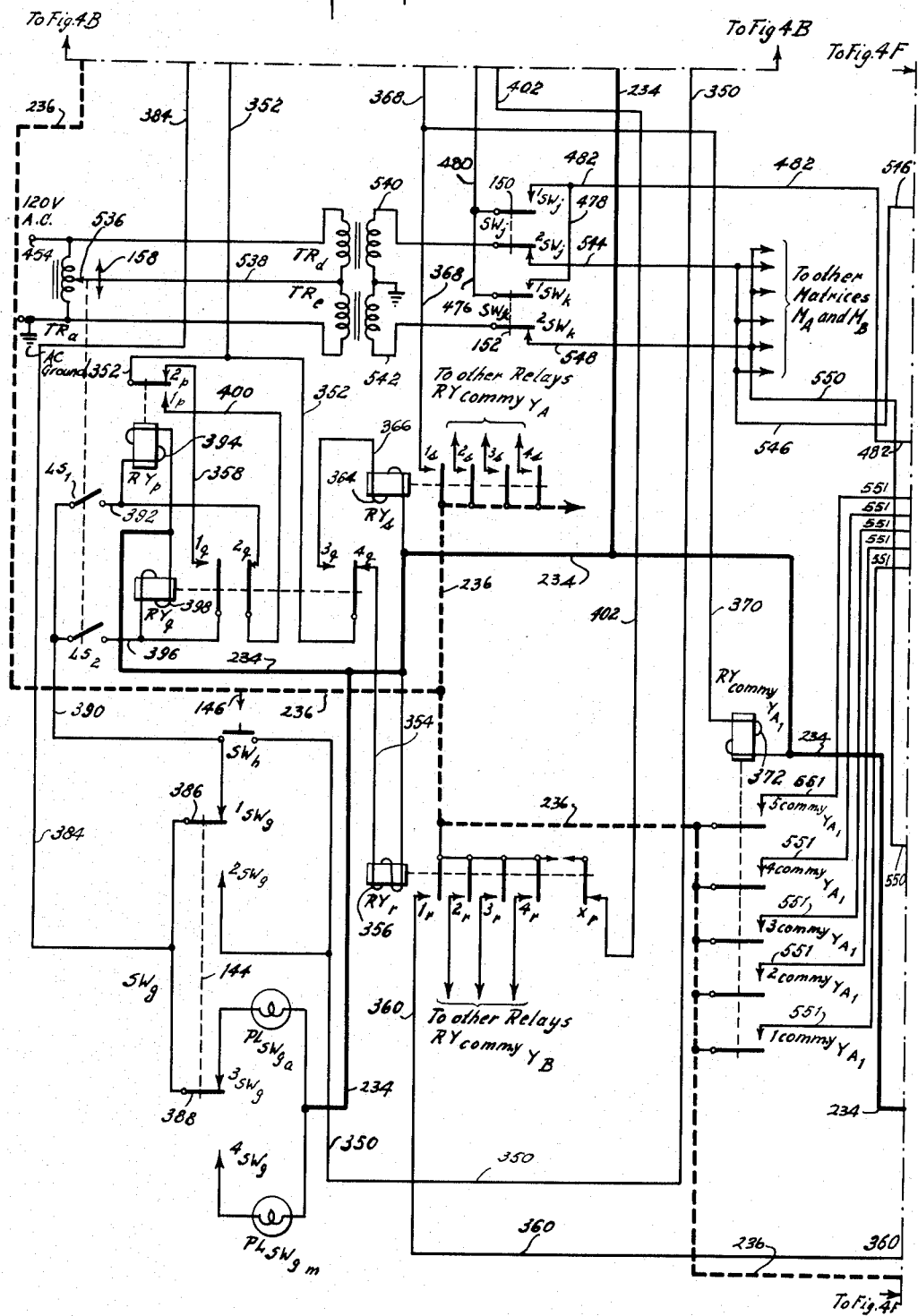

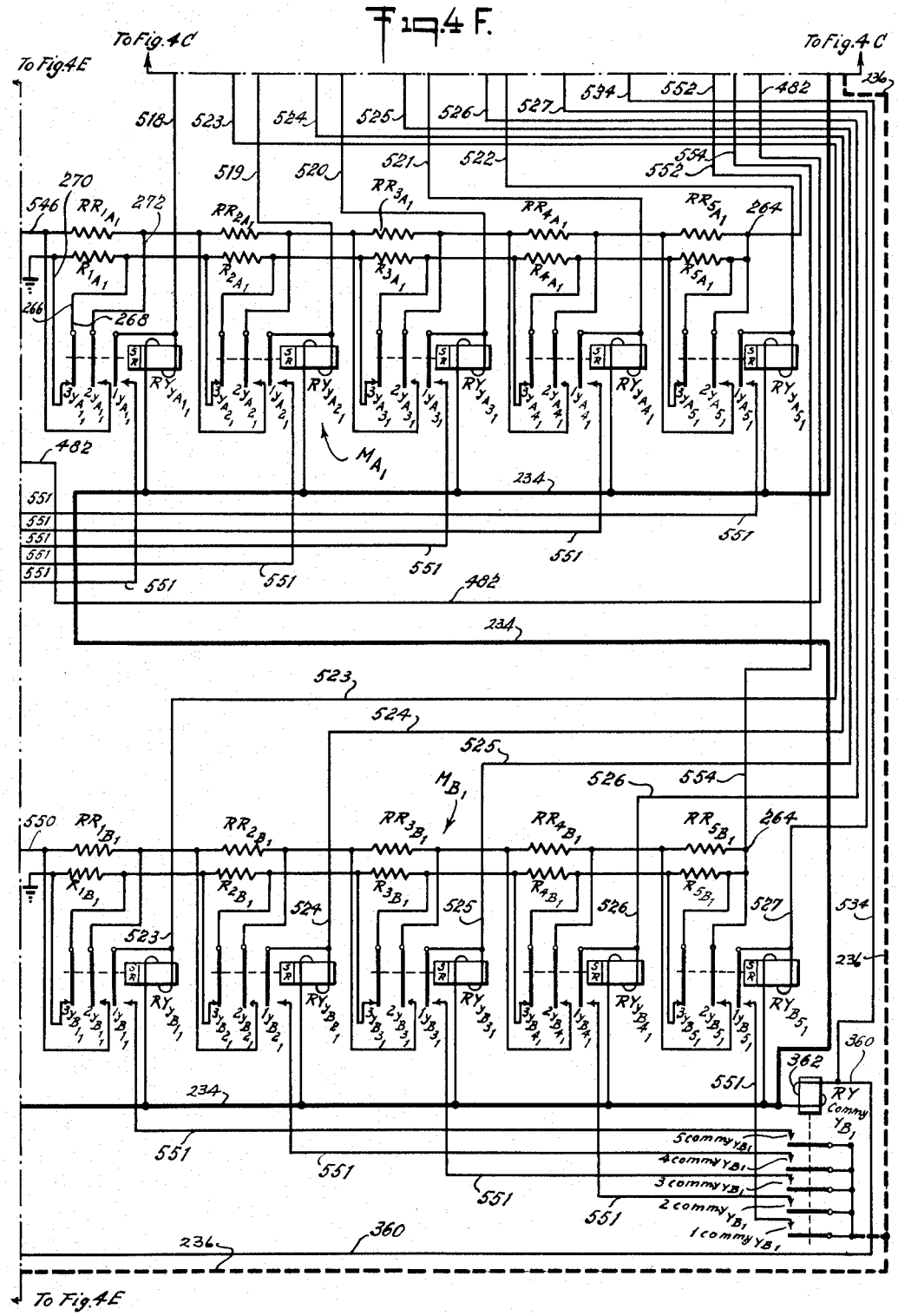

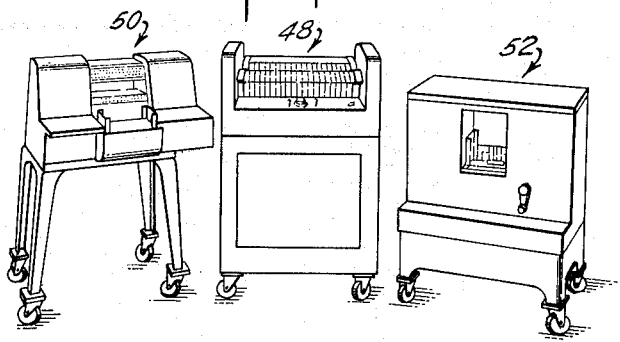
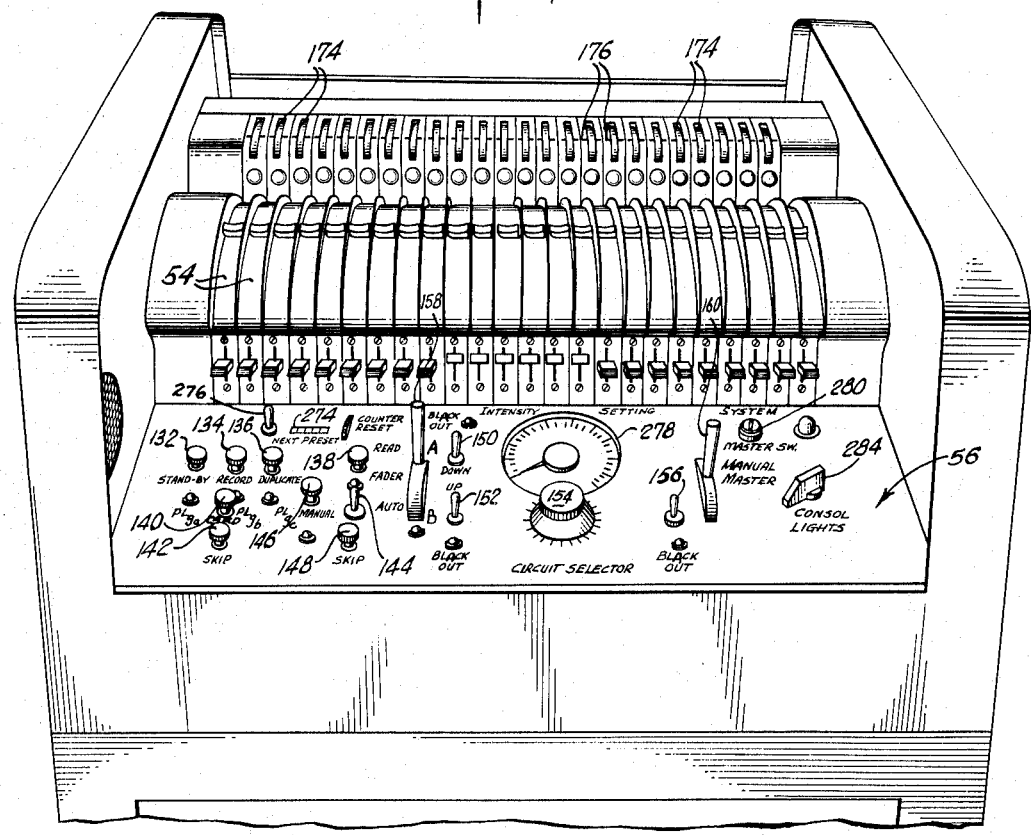

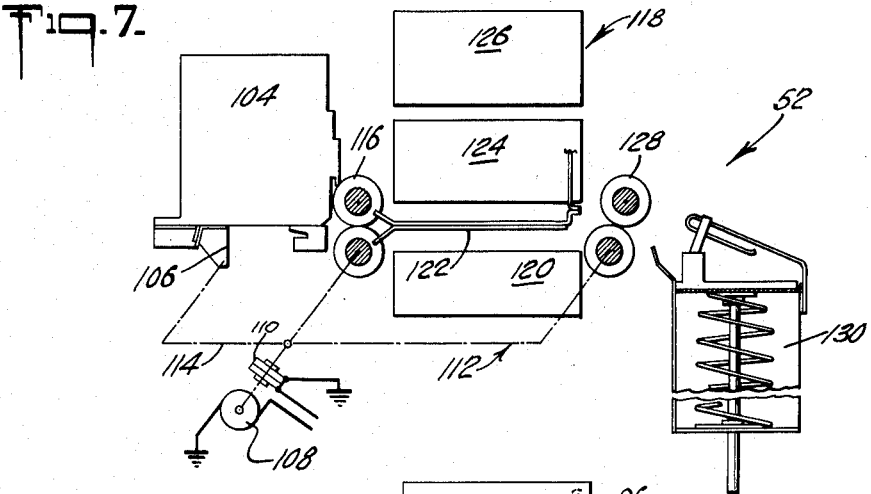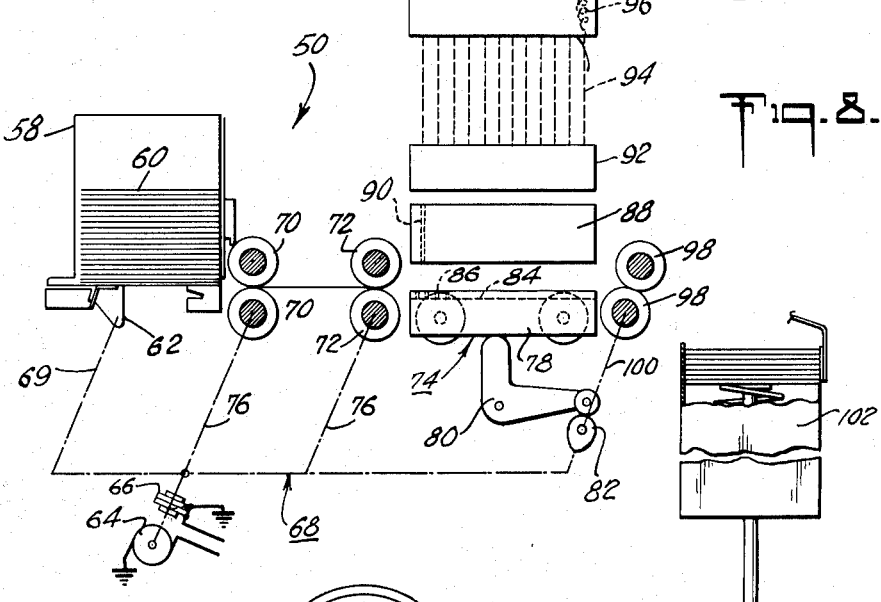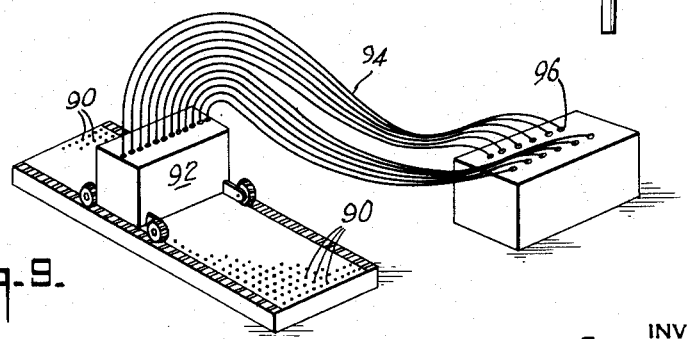

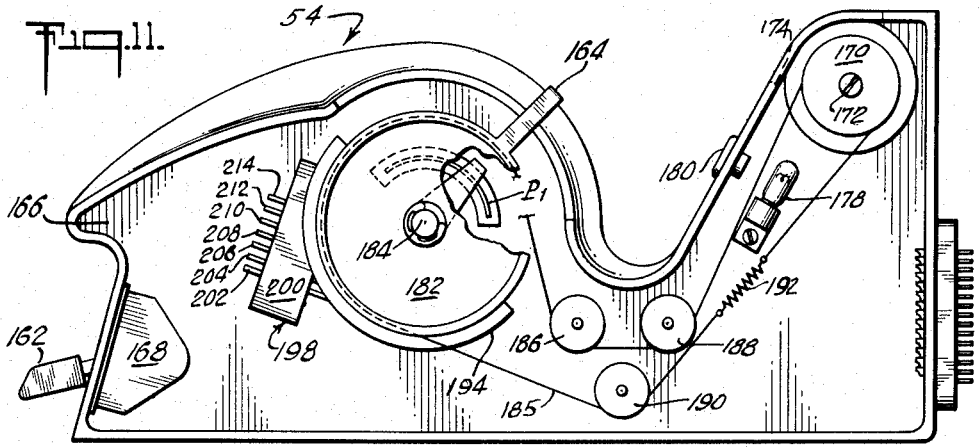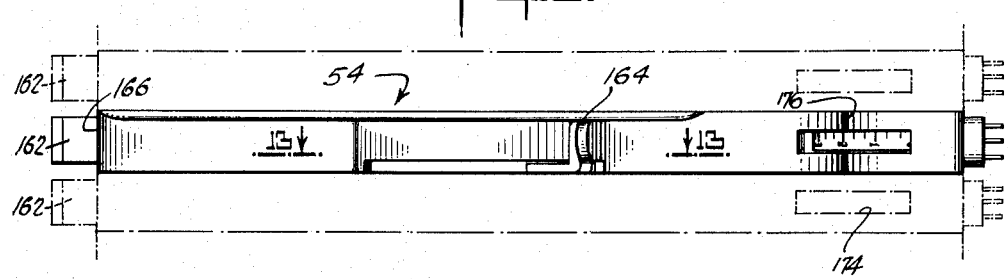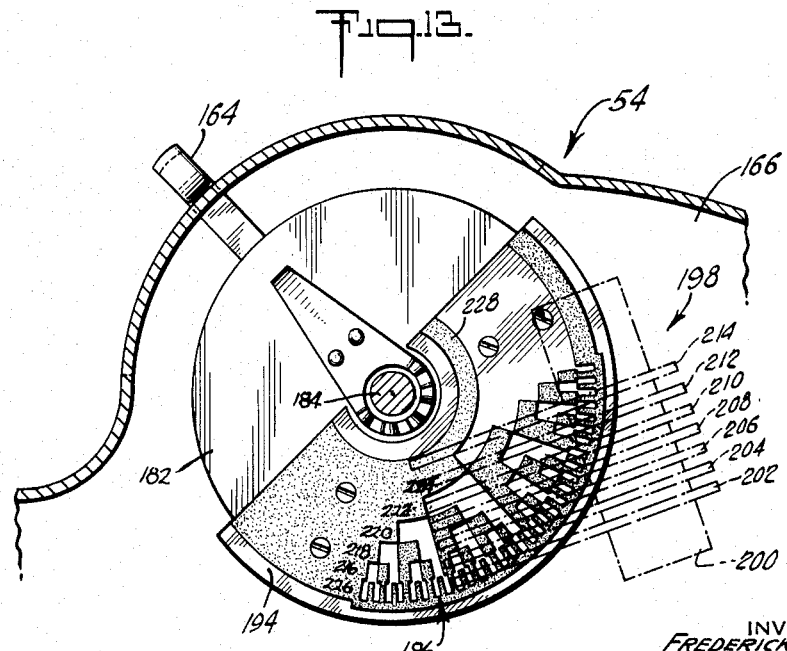

3,221,214
LIGHTING CONTROL SYSTEM
Frederick M. Wolff, Montclair, N.J., and George C. Izenour, New Haven, and David H. Locklin, Hamden, Conn., assignors, by mesne assignments, to Century Lighting, Inc., a corporation of New York
Filed Sept. 8, 1959, Ser. No. 838,730
17 Claims. (Cl. 315—292)

This invention relates to a lighting control system. More particularly, the invention relates to a remote control system which will regulate, in accordance with a predetermined schedule, at least one characteristic of plural pieces of lighting equipment, such, for instance, as intensity, color, position of one or more optical elements, or polar orientation.

Although in the following description we will describe the invention specifically as applied to intensity control of lighting equipment and specifically will show the use of voltage dividers for this purpose, our invention is not to be so limited, i.e., it is not limited to the control of intensity nor to control by the use of voltage dividers. As an example, our invention embraces the azimuth control of rotatable pieces of lighting equipment, for instance, spotlights, by the use of variable auto-transformers.

In recent years the operation of lighting control systems in theatres, television studios, and commerical installations has become increasingly complex. Variations in intensity, color and distribution, rapid changes and the number of settings required have greatly increased the number of controls and control circuits. It is usual at the present time to regulate lighting from a control center. In order to bring the elements of the control center within reasonable working distance of one or a few operators larger systems use a remote control network for the actual dimmer and positioning devices, these remote controls generally taking the form of small potentiometers, miniature variable autotransformers or both. Such devices permit the operator to select, i.e., to "pick off" low control voltages which, when applied to various types of A.C. power units, such as magnetic amplifiers, thyratrons, motor drives and controlled rectifiers, cause these units to provide a corresponding voltage, position or color for the lighting equipment.

Moreover, it is the present practice for a director or one of his assistants to determine in advance of the actual performance the various settings for different characteristics of the various pieces of lighting equipment, this being done by experimentation, for instance, during rehearsal. These settings will change from time to time, sometimes only a few seconds apart, during a scene or act. Accordingly, the operator or operators must quickly change the settings of a very large number of control devices from time to time during the progress of a play or the like.

Usually, the operator is provided with groups of control devices one of which controls the current characteristics of the lighting equipment and others of which are set in advance to control future characteristics of the lighting equipment. Due to this ability to regulate the future characteristics, these control devices are commonly known as "presets" and it is not at all extraordinary for a lighting control system to utilize as many as ten groups of presets for a single piece of lighting equipment, so that when the occasion arises the operator may change from one value of a characteristic to a second and a third and a fourth, etc. within a short period of time. Thereafter, when his time permits the operator will reset the used presets to some new value of the characteristic to be controlled.

During rehearsal a primary or "rehearsal" control is used for setting a characteristic, i.e., condition, of each piece of lighting equipment. The same control may be used for "manual" or individual control during a presentation, that is to say, an actual enactment, for instance, of a scene. The "presets," on the other hand, are set at readings which have been determined during the rehearsals for each of several times, cues, or, as is commonly referred to in lighting practice, "scenes." The master controller moved by the operator then selects whichever presets are required and moves the circuit readings smoothly and evenly from those corresponding to any one group of presets to other readings corresponding to those of another group of presets.

The individual presets are not required to vary their outputs at a given rate over a given period of time, this being the function of the master controller, i.e., the "fader." The individual presets merely are required to select a given reading corresponding to a given value of characteristic for a piece of lighting equipment at a given time. Whether this selection is performed by a switch, a relay, a potentiometer or any other device has no bearing upon the operation.

The growing complexity of lighting equipment has in turn complicated the control panel many times to the point where no one person can properly operate the system. Literally hundreds of pieces of lighting equipment must be controlled and a large number of presets must be manipulated with dexterity and speed.

Some efforts have been made to simplify this problem by the use of group masters (variable transformers or potentiometers) which exercise control over selected groups of individual controls. Also, scene masters have been used to provide the mastering of the individual controls in any one scene or cue. Still further, submasters frequently have been added to break up scene master or group master control groups. And multi-throw switches for each individual control circuit and master control have provided an apparatus for selecting the master or masters to be used. However, all of the above modifications have been provided for but one of two reasons, to wit, to provide greater flexibility for the operator when in "manual" or "independent" control or to reduce the number of scene presets required for a given presentation. Additional scene presets for each control circuit add greatly to the size, complexity, and cost of the control system. Ten scene presets, for example, are nearly twice as costly and occupy twice the space of five. But a majority of presentations require many more than ten presets. Therefore, using a ten scene preset system for example, after preset 1 has been left by the operator mastering or "fading" into preset 2, preset 1 must be reset to preset 11. Later preset 2 becomes preset 12, ec. If an infinite number of presets were available, no resetting would be necessary. And with an infinite number of scene presets, no manual operations would be required save in rehearsal or "set-up." Here, where exact timing is unimportant, individual circuit controls would be satisfactory and the complications of masters and submasters could be eliminated.

It is an object of our invention to provide a system which affords an infinity of presets that may be established directly from rehearsal set-ups or can be set up in predetermined readings. Heretofore with manual presetting alone, in addition to size and cost, much time was required in rehearsal as well as in setting up and re-setting presents during the presentation. The likelihood of error was great. In rehearsal, readings had to be made of the indication for each control circuit. These readings were then transferred to "cue" sheets. During the presentation the cut sheets had to be read and the readings transferred to the individual presets. This arrangement idled expensive directorial and acting time while the readings were being taken and transferred.

It is another object of our invention to provide a system of the character described which can almost instantaneously record all of the necessary preset information for a scene without individually noting the preset information for any single individual circuit control.

It is another object of our invention to provide a system of the character described which can record all the information to be preset for a single scene simply upon the movement of a single control, e.g., the pressing of a button or the throwing of a switch.

It is another object of our invention to provide a system of the character described which can record in a very short period of time, e.g., a matter of seconds, a very large number of sets of information to be held for insertion or read-out subsequently into individual system circuits when the same are desired.

It is another object of our invention to provide a system of the character described wherein the preset information, although not the actual presets themselves, is in permanent form which may be handled manually and easily and arranged in any desired order and duplicated with ease when desired and with or without correcting the same.

It is another object of our invention to provide a system of the character described wherein human error in the recording of information is eliminated and in which such recording is accomplished automatically, that is to say, by equipment rather than manually with the aid of the human hand, eye and brain.

It is another object of our invention to provide a system of the character described in which instantaneous corrections may be made to preset circuit conditions.

It is another object of our invention to provide a system of the character described in which the preset information can be recorded with extreme rapidity and after recording can be scanned, i.e., read back, with great speed.

It is another object of our invention to provide a system of the character described wherein the recorded information is inscribed on discrete members, such, for instance, as single cards, and further wherein the amount of such information which can be recorded is not limited to the size of such a member, the system being so flexible that the information can be recorded on a series of members in sequence and subsequently read back sequentially or in any other order desired from such series.

It is another object of our invention to provide a system of the character described in which the recording and reading of numbers is so rapid that the use of several cards for a single scene preset does not interfere with normal operation.

It is another object of our invention to provide a system of the character described wherein a group of members on which information is recorded, e.g., a stack of cards, can be moved, used and otherwise handled as an entity, the members being properly arranged in the group and the feeding of the members into and out of the group being automatic.

It is another object of our invention to provide a system of the character described in which despite the ability to utilize the members in a predetermined sequence, such members may be recorded or the information therefrom read out of order, that is to say, in a sequence other than the predetermined one.

It is another object of our invention to provide a system of the character described which despite its apparent complexity has a low initial cost in contrast to that of a conventional system which is capable of providing a like number of presets and a like flexibility.

It is another object of our invention to provide a system of the character described which has a low operating cost in terms of man hours required for recording and resetting presets during rehearsals and presentations.

It is another object of our invention to provide a system of the character described in which it is particularly easy to read out the information for any preset in any order or to change presets or even to skip presets at will.

It is another object of our invention to provide a system of the character described the physical portion of which is highly compact and the controls for which are very simple.

It is another object of our invention to provide a system of the character described which can be operated remotely either for recording or reading out information, and wherein the final control during presentation requires the use of only a single handle.

It is another object of our invention to provide a system of the character described wherein the operator can revert to manual control in case of emergency such as a failure of a part of the automatic equipment.

It is another object of our invention to provide a system of the character described wherein the emergency manual reversion can be accomplished either circuit by circuit or throughout the entire lighting system at once.

It is another object of our invention to provide a system of the character described in which the operator is able at any time he desires to read out the information set into the control circuits, circuit by circuit instantaneously.

It is another object of our invention to provide a system of the character described in which presets of information can be sequenced either automatically by movement of the fader equipment or manually as by use of a special button or switch when the system is reading information into the individual circuits.

It is another object of our invention to provide a system of the character described which is capable of skipping presets from normal sequence at will.

It is another object of our invention to provide a system of the character described which can transfer information from preset cards to electric memory circuits and hold this information for indefinite periods of time.

It is another object of our invention to provide a system of the character described wherein the operator can "fade" to or from "black-out" or move to a homing position and while in such black-out or homing position skip or omit presents.

It is another object of our invention to provide a system of the character described in which skipping cannot be performed while the fader is being operated, thus preventing the possibility of errors when between two presets.

Other objects of our invention in part will be obvious and in part will be pointed out hereinafter.

Our invention accordingly consists in the features of construction, combinations of elements and arrangements of parts which will be exemplified in the lighting control system hereinafter described and of which the scope of application will be indicated in the appended claims.

In the accompanying drawings, in which are shown various possible embodiments of our invention, FIG. 1 is a diagrammatic view of a conventional voltage divider;

FIG. 2 is a diagrammatic view of a resistance-relay network constructed in accordance with a feature of our invention and embodying in the simplest form the principle by which we have approximated for binary coded operation a voltage divider such as that of FIG. 1;

FIG. 3 is a diagrammatic view of a resistance-relay network similar to that shown in FIG. 2, but of more complex form for finer degrees of gradation;

FIG. 4 is a circuit diagram of our lighting control system, the same including, as shown, a control section for manual and automatic regulation of a single power unit, the same being in six parts designated FIG. 4a, FIG. 4b, FIG. 4c, FIG. 4d, FIG. 4e and FIG. 4f.

FIG. 5 is a thumbnail perspective view of the three principal pieces of equipment used in our lighting control system, to wit, a card punched, a console and a card reader;

FIG. 6 is an enlarged perspective view of the console keyboard and bank of control units;

FIG. 7 is a schematic view of the principal operating parts of the card reader;

FIGS. 8 and 9 are schematic views of the principal operating parts of the card punch;

FIG. 10 is a face view of a typical preset card;

FIG. 11 is a side view of a manually operable control unit for an individual control circuit;

FIG. 12 is a top view of said unit; and

FIG. 13 is a sectional view taken substantially along the line 13—13 of FIG. 12.

In a lighting control system embodying our invention each control circuit includes two electrical elements, preferably of like kind, each of which is capable of having a similar electrical value thereof, e.g., voltage, individually changed. For example, such elements may constitute variable autotransformers or potentiometers, a typical system of our invention utilizing two potentiometers for each control circuit. These elements are regulated by an external memory system. While one element is in control of a piece of lighting equipment the other element which then is idle is set by means of the memory system so as to supply a voltage value, i.e., to assume a reading or position, which has been predetermined for the next scene. The operator by moving a changeover device, i.e., a fader, gradually changes, i.e., fades, the control signal to the piece of electric equipment from that of the initially controlling element to that of the second element, i.e., to the next scene preset. Now the memory system resets the first element which is idle while the second element is active, the first element being reset from scene 1 to scene 3. Next the fader is returned to its original position and the lighting will be altered to preset 3 condition. While this is occurring the second element which again is idle is changed to preset 4 condition. This handling of presets with only two variable control elements might be referred to as a two scene preset system with a memory system doing the presetting, e.g., with the aid of potentiometers, i.e., voltage dividers.

It will be apparent from the foregoing that the two variable electrical elements are not per se required to move or to change taps smoothly during the rearrangement of their setting in idle position, this being the function of the fader or master control. The elements must only be capable of being set by the memory system at a number of different points. This number might be established, depending upon the function to be performed, at anywhere from two to many hundreds. The accuracy required also will determine the number of points to be utilized. For the purpose of illustration we have shown herein 32 different positions which have been found to be adequate for practical control of electric lighting intensity. It will be understood, however, that this particular number is in no way to be considered as limiting. For instance, 64, or many more control positions can be provided with ease and might or might not be necessary or appropriate for color control, control of direction, various combinations of controls, or still other controls.

The potentiometer 10 shown in FIG. 1 is a conventional potentiometer such as is presently used for controlling electric lighting equipment, e.g., for the purpose of regulating intensity. It constitutes a length of electrical resistance material which may, for example, be wound on a supporting strip and the turns of which are adapted to be engaged along the length of the strip by the contact end of a movable slider 12. For the purpose of controlling intensity of illumination, the variation of resistance between any two turns is so small that the potentiometer is considered to afford an almost continuously variable regulation.

The potentiometer is a voltage divider. Depending upon its position it will pick off any voltage between the extremes of voltage applied to the terminal ends of the resistance. For example, if 10 volts is applied across the resistance terminals, the voltage appearing between the tap and either of the terminals will vary from zero to ten volts. The absolute resistance value of the potentiometer has no bearing upon its ability to divide the voltage appearing across its terminals.

Let it be considered that the potentiometer resistance has a uniform resistive gradient and that there are only four taps on the potentiometer, two of these taps being at the terminal ends of the potentiometer and the remaining two taps being one-third of the distance from each end. The resistance between each end of the potentiometer and the closest intermediate tap will be denoted by the reference character $R_1$ and the resistance between each intermediate tap and the remote terminal will be denoted by the reference character $R_2$. When the slider 12 is on the left-hand intermediate tap, as shown in full lines in FIG. 1 the resistance from this tap to the nearest end terminal will be $R_1$ and the resistance from this tap to the other end terminal will be $R_2$. If the slider is swung to the other intermediate tap the resistance values likewise will be $R_1$ and $R_2$, but they will be reversed.

In FIG. 2 we have shown how, pursuant to a feature of our invention, we have provided an arrangement, specifically a resistance-relay network 14, which is capable of being operated by a binary code and which will provide the same two values of $R_1$ and $R_2$ and their reversal and also the electrical equivalent of locating the slider 12 on either end terminal. Said network is the simplest form of this phase of the invention and has been shown to aid in the comprehension thereof. Such type of network can, as soon will be seen, be expanded to a greater complexity in order to provide more refinement in the equivalent positioning of the potentiometer slider, although the actual circuit illustrated will, under certain conditions, suffice for some functions.

The network 14 includes two banks of fixed resistors of different value. Each bank includes a first resistor having a resistance value and denominated $R_1$ and a second resistor having a resistance value and denominated $R_2$. The resistors $R_1$ and $R_2$ in each bank are connected in series at point 16. One terminal of each bank is connected to a source of electric energy. The remaining terminals of the banks are connected to one another by a lead line 18, so that the to banks are connected in series. A terminal 20 is located in the lead line 18. For a reason which soon will be apparent this is referred to as the "slider" terminal.

It is pointed out that the total resistance value of each bank of resistors, i.e., $R_1+R_2$, is equal to the value of the resistance of the equivalent potentiometer 10 and that the absolute values of $R_1$ and $R_2$ are equal to the values $R_1$ and $R_2$ for the tap points of the equivalent potentiometer 10. Preferably, and in order to obtain a maximum uniformity of variation for the various positions of the equivalent potentiometer, $R_2$ has a resistance value twice that of $R_1$.

The resistor $R_1$ of each bank is provided with a pair of lead lines 22 running to a shunting switch 24 of a relay 26. One of the switches is normally open and the other normally closed. Similarly, each resistor $R_2$ has a lead line 28 and the lead line 18 runs to a shunting switch 30 of a relay 32. One of the switches 30 is normally open and the other normally closed.

As shown in FIG. 2, when the two relays are idle, i.e., de-energized or de-activated, the resistors $R_1$ and $R_2$ of the left-hand bank are shunted out, while the resistors $R_1$ and $R_2$ of the right-hand bank are effective. Therefore, the left-hand power terminal of the network 14 is directly connected to the slide terminal 20 and the resistors $R_1$ and $R_2$ of the right-hand bank are interposed in series between the slide terminal 20 and the right-hand power terminal of the network. This is the equivalent of having the slider 12 of the conventional potentiometer of FIG. 1 resting on the left-hand terminal tap.

If now only the relay 26 is energized the resistor $R_1$ of the left-hand bank will be interposed between the left-hand power terminal and the slide terminal 20 and only the resistor $R_2$ of the right-hand bank will interposed between the slide terminal 20 and the right-hand power terminal. This is equivalent of having the slider 12 located on the left-hand intermediate tap of the conventional potentiometer illustrated in FIG. 1.

Next, if the relay 26 is de-energized and the relay 32 energized, the resistors of the network 14 will be so connected that they will be equivalent to having the slider 10 12 of the conventional potentiometer 10 in FIG. 1 on the right-hand intermediate tap. Finally, if both relays 26 and 32 are energized, the network 14 will be equivalent to the conventional potentiotmeter 10 with the slider 12 on the right-hand terminal tap.

It thus will be seen that we have in this simple manner provided a resistance-relay network which is the equivalent of a potentiometer acting as a voltage divider and is capable of binary code operation by virtue of the "off" or "on" position of each relay. For the purpose of maximum evenness, the resistors utilized have values which are so proportioned that (a) any resistor in any bank has a resistance value twice that of the next lower value resistor, (b) the total resistance value of all the resistors in each bank is equal to the total resistance value of all the resistors in the other bank, and (c) when any given resistor of a specific bank is shunted, the corresponding resistor in the other bank is unshunted, i.e., rendered effectively operable in the circuit.

It further will be appreciated that the number of equivalent slide positions is equal to $2^n$ when $n$ is equal to the number of resistors in each bank. In the example just described $n$ is equal to 2 and $2^n$ therefore equal to 4, that is to say, with 4 resistors, 2 in each bank, we have provided the 4 equivalent positions for the equivalent slide of the equivalent potentiometer. Although this is a seemingly high cost in equipment to pay for the number of positions obtained, it will be realized that as $n$ is increased, the number of positions increases exponentially. For example, if there are 3 resistors in each bank (6 resistors in all and 3 relays), the number of equivalent slide positions will be 8. Going a step further, if the are 4 resistors in each bank and 4 relays, the number of equivalent slide positions will be 16. With 5 resistors per bank and 5 relays the number of equivalent slide positions will be 32, etc.

It will be appreciated that with the foregoing network we have provided an equivalent potentiometer of suitable accuracy which can be operated by means of external information in the forms of "on" or "off," i.e., binary, signals, this being capable of adaptation to a memory system. With 5 such signals, i.e., with 5 bits of information (one for each relay), an equivalent potentiometer of this type operating upon 5 relays can be made to assume any one of 32 slide positions. This obviously is superior in simplicity to any control system which requires 32 bits of information or even the addition of fractions to whole numbers to form signals. Moreover, such a system is capable of very rapid operation, so that a given combination of presets can be quickly arranged merely by feeding the necessary information to a group of such equivalent potentiometers. For a complete two scene preset system of the type which constitutes the preferred embodiment of our invention all that is necessary is two groups of equivalent potentiometer resistors and two groups of relays together with a holding relay or the like for each group to maintain the information in the equivalent potentiometer network, sometimes hereinafter referred to as the "translator relay matrix," once it has been received, so that any given setting of a group can be retained while the group is in control of a scene and while another setting is imparted to the other group.

In FIG. 3 we have illustrated a more complex translator relay matrix or network 34 having power input terminals 36, 38, the network constituting an equivalent of a potentiometer having 32 tap positions with uniform resistance values therebetween. Said matrix includes two series-connected like sets 40, 42 of resistors $R_1$, $R_2$, $R_3$, $R_4$, $R_5$, and $RR_1$, $RR_2$, $RR_3$, $RR_4$, $RR_5$. All the companion resistors of the two sets are equal, that is to say, the resistor $R_1$ is equal to the resistor $RR_1$, the resistor $R_2$ is equal to the resistor $RR_2$, etc. Each resistor $R_1$, $RR_1$, has a resitance value of one unit, each resistor $R_2$, $RR_2$ a resistance value of two units, each resistor $R_3$, $RR_3$ a resistance value of 4 units, each resistor $R_4$, $RR_4$ a resistance value of 8 units, and each resistor $R_5$, $RR_5$ a resistance value of 16 units. The value of $n$ in this matrix is 5. The number of tap positions, $2^n$, is 32. Each resistor is provided with a shunting switch 44, the switches being so arranged that when a shunting switch for a given resistor is closed, the shunting switch for the companion resistor is open. The shunting switches for each companion pair of resistors are part of a single relay actuated by a coil 46. It will be appreciated that with this arrangement the total resistance value of the equivalent resistor matrix never varies from the sum of $R_1$, $R_2$, $R_3$, $R_4$, $R_5$, or $RR_1$, $RR_2$, $RR_3$, $RR_4$, $RR_5$, and that, by providing various combinations of actuated and idle relays, the position of the tap terminal 47 between the two series in the equivalent potentiometer can be stepped by 32 uniform resistive increments each equal to the value of a resistor $R_1$ or $RR_1$.

Basically, the memory system which forms part of our control system in accordance with the invention consists of two machines, in the preferred form of our invention these being commercial machines, so that they may be purchased and used as individual units. Said two machines typically constitute a first machine for receiving and holding as a storage memory the required number of signals, i.e., bits of information, for each individual control circuit, and a second machine for selecting a desired storage memory, scanning and extracting the required information for each individual control circuit and, when desired, transmitting this information to the proper control circuits. Pursuant to our invention these signals are received and stored rapidly, accurately and automatically and are capable of retransmittal at will in any selected order of scene presets and at high speed.

Such memory systems are presently available in the form of magnetic and punched tapes, magnetic drums, magnetic discs, magnetic wires and cards. However, most of the existing systems are either too slow, too expensive, incapable of rapid change in order of sequence of transmittal, or are otherwise incapable of handling the data as required. For example, a magnetic or punched tape stores the signal in non-changeable sequence and therefore unless very expensive equipment is utilized, makes it difficult to change the sequence of the signals as they are read out. Moreover, in the event a group of signals is to be changed it is impossible to make such an alteration in the punched tape and difficult with magnetic tape. We have found that the best results have been achieved with a memory system which utilizes cards, since the sequence of these can be rearranged quite easily and since the markings from one card can be inscribed on another card speedily and easily with any corrections that are desired to be made.

In the most desirable form of our invention we employ punched cards, one or more for each scene preset. It will be understood, however, that our invention is not to be limited thereto. A memory system utilizing punched cards consitututes a card punch to which the signals are fed and which will by operations that are well known in the field impress the signals on a given card by punching openings therein in predetermined locations which are a function of the information to be inscribed. The system further includes a card reader capable of reading the signals punched into the cards and transducing them into electric signals for transmittal to the translator relay matrices hereinabove described.

In FIG. 5 we have shown the three pieces of equipment which make up the control center of the present invention, to wit, a console 48, a card punch 50 (see also FIG. 4B) and a card reader 52, (see also FIG. 4D).

The console includes all the manually operable components of the system, these comprising a plurality of manually operable units 54 each of which regulates a different one of the individual control circuits, and a keyboard 56 on which are located different function control push buttons, switches, levers, pilot lights and handles for the entire system. The console also preferably houses various other circuit elements, e.g., resistances, transformers, relays, rectifiers, motors, etc.

As indicated previously, the card punch 50 preferably constitutes a commercially available machine. The one illustrated herein is a card punch manufactured by the Remington Rand Division of the Sperry Rand Corporation of 315 Fourth Avenue, New York City. The particular card punch which we have employed in our system is type No. 3906.

Referring to FIGS. 8 and 9, said punch includes a card magazine 58 which is adapted to have placed therein a stack of cards 60 (see FIG. 10). Each card is adapted to be perforated at any one of a plurality of positions which, as is well known in the card punching art, are identified by the coordinates of vertical column and horizontal row. The particular card 60 illustrated herein and intended to be used on the specific card punch 50 is a 540 position card having 90 vertical columns, respectively designated by the reference characters 1, 2, 3, 4, . . . . 88, 89, 90, and 6 horizontal rows, respectively designated by the reference characters 0, 1, 3, 5, 7, and 9, these being the notations of the manufacturer. The manufacturer splits up the vertical columns into two sets, one above the other, so that the first 45 columns, 1, 2, . . . 44, 45, occupy the upper half of the card and the last 45 columns, 46, 47, . . . 89, 90, occupy the lower half of the card. Thus every punch position has a pair of grid coordinates constituting a column and a row. For example, $1_0$ is the top row in the first column; $46_0$ is the top row in the 46th column which is the first column at the left of the lower half of the card; $23_7$ is the 5th row in the 23rd column, which is in the upper half of the card, etc. The presence or absence of an opening at any given position constitutes a binary signal which either will actuate a relay or cause it to remain de-actuated. It may be mentioned at this point that the first five, i.e., the "0," "1," "3," "5" and "7," rows in each column are utilized to record and store the five bits of information which will determine the condition of the five relays in any given translator relay matrix. The sixth, i.e., "9," row in each column is employed for the purpose of verification.

At the bottom of the magazine 58 is a feed slide 62 which is intermittently energized by a motor 64. The card punch runs through a single cycle of operations each time it is rendered active, the operation of the card punch being controlled by an electrically regulated one cycle clutch 66, that is to say, when a pulse is fed to said clutch the state of the clutch is changed from ineffective, i.e., idle (no power transmitted), to actuated (power transmitted). Because the clutch is a one cycle clutch, every time a pulse is received, the clutch will remain actuated for one cycle of operation of the card punch and then stop. The reference numeral 68 in FIG. 8 schematically denotes a kinematic train which is driven by the clutch output and which includes, inter alia, a kinematic transmission 69 for actuating the card feed slide 62 when the clutch is actuated so as to deliver the lowermost card in the magazine to a first pair of feed rolls 70. Said pair of feed rolls 70 is associated with a second pair of feed rolls 72, the two pairs of feed rolls between them being adapted to hold a card 60 after the same has been discharged from the magazine 58. At the end of any given cycle of operation of the card punch there will be a stack of cards in the magazine and one card held by the two pairs of feed rolls.

During each cycle of operations the lowermost card in the magazine will be delivered to the two pairs of feed rolls and the card which previously was held by the two pairs of feed rolls will be delivered to a punch and die unit 74. The pairs of feed rolls 70, 72 are driven from the clutch 66 through the kinematic train 68 and shafts 76.

The punch and die unit includes a vertically translatable die carriage 78 which is intermittently raised or lowered by an actuating lever 80 driven from a cam 82 operated by the kinematic train 68. Said carriage includes a horizontal plate 84 in which are provided a large number of die openings 86, one for each of the 540 card positions. Vertically above the carriage 78 is an intermediate pin section 88 provided with 45 lines of twelve pins 90 each located directly above a different die opening in the punch and die unit 74. Each said pin 90 has an upper position and a lower position in each of which positions the pin is latched, the pin being ineffective to punch in its upper position and effective for such purpose in its lower position. In ineffective position the bottom of the pin is within the intermediate section 88. In effective position the bottom of the pin protrudes below said section.

The top of the section 88 is formed with tracks (not shown) on which there horizontally steps a traversing mechanism referred to as a setting bar 92. The setting bar constitutes a line of twelve setting members, there being one setting member for each of the twelve pins 90 in a line. Thus, the traversing setting bar, when aligned above the pins 90 of any given column, has its setting members in registration with the individual pins of such column.

Cables 94 connect each setting member to a different solenoid 96. When any particular solenoid is actuated, it will depress its associated setting member and in turn depress the pin 90 in the row of the column over which it is then located. Each solenoid is connected in a circuit by means of a pair of leads, the connections in the circuit herein being described being such that all the solenoids have one positive terminal in common and one terminal connected for reception of a negative signal.

On the side of the punch and die unit remote from the feed rolls 72 there are provided a pair of ejecting rolls 98 driven from the clutch 66 through the kinematic train 68 and a shaft 100. Finally, the card punch unit includes a card receiver 102 in which cards leaving the ejecting rolls are deposited.

A cycle of operations of the card punch 50 first requires that individual pins 90 be set up or not set up according to a predetermined pattern. This is achieved by successive groups of binary signals which are fed in sequence, a column at a time, to the solenoids 96 during the cycle. The signals determine the actuation or failure to actuate any given solenoids typically in the punch being described, six signals will be received by the solenoids, the term "signal" meaning voltage or absence of voltage supplied to a solenoid so that each solenoid will either be actuated or deactuated according to a predetermined pattern. Ninety successive groups of six signals are received in each cycle of operations. The first group of solenoid signals move selected pins 90 from latched ineffective positions to latched effective positions in the first column. Then the setting bar 92 is automatically stepped to the next column by a pulse supplied to a solenoid (not shown) actuating the pin in row 9 and the second group of signals is received, etc. After all the lines of pins 90 have been set for a given scene preset, a pulse is received by the clutch 66 thereby to connect the previously energized motor 64 to the kinematic train 68. The lowermost card in the magazine is delivered to the feed rolls 70, 72. The card which previously was between the feed rolls is delivered to the punch and die unit and the card which was previously in the punch and die unit is delivered to the card receiver 102. The card which was freshly delivered to the punch and die unit is then raised by the carriage 78, actuated by the kinematic train 68, and is punched by punches set up by pins 90 that were latched at the positions at which solenoids were sequentially energized. Lastly the kinematic train 68 returns the setting bar 92 to its original position and the clutch 66 is de-energized.

The electric wires (see FIG. 4B) leading to the card punch will include a live and a return (ground) lead for the cycle pulse that actuates the clutch, one live and one return lead for energizing the motor, and six live and one return lead for the solenoids (the upper and lower half of each card being punched in turn). The various operations are under the control of a sequencing switch.

The card reader 52 likewise is a commercially available machine, e.g., type No. 204–2, manufactured by the Remington Rand Division of said Sperry Rand Corporation.

Referring to FIG. 7, the reader includes a card magazine 104 which is adapted to have placed therein a stack of preset punched cards 60, these being cards having holes at the proper grid coordinates. At the bottom of the magazine 104 is a feed slide 106 which is intermittently energized by a motor 108. The card reader runs through a single cycle of operations each time it is actuated, the operation of the card reader being controlled by an electrically regulated one cycle clutch 110. That is to say, when a pulse is fed to said clutch the state of the clutch is changed from idle to actuated. Because the clutch is a one cycle clutch, every time a pulse is received, the clutch will remain actuated for one cycle and then stop. The reference numeral 112 schematically denotes a kinematic train which is driven by the clutch output and which includes, inter alia, a kinematic transmission 114 for actuating the card feed slide 106 when the clutch is actuated so as to deliver the lowermost card in the magazine 104 to a pair of feed rolls 116.

Said feed rolls 116 transfer the punched card to a card sensing unit 118. This unit includes a lower sensing pin box 120 which is mounted for vertical travel below a card supporting frame 122 on which is held in temporarily fixed position a card delivered by the rolls 116. Above the frame 122 is a lock box 124. When the lower sensing pin box 120 is raised upon actuation of the clutch 110, it includes a group of sensing pins all in raised positions, there being one sensing pin for each pair of grid coordinates. As the pins are elevated with the box, those pins which are in registry with unpunched positions will cease their upward movement.

The remaining pins (in registry with punched holes) will continue their upward movement through the punched card to raise associated pins in the lock box 124, there being one pin in the lock box for each pair of grid coordinates, in other words 540 lock pins. Each pin in the lock box which is raised will be latched in elevated position and will not be released until the beginning of the next cycle of operations.

When a pin in the lock box is raised it will close an associated pair of contacts in a sensing switch box 126 directly above the lock box. There is one such pair of contacts for every grid position on the card. Thus, when the lower sensing pin box is elevated, it will, through the mechanism described, close a pair of contacts for every hole punched in the card held in the frame 122.

After the pairs of contacts have been closed, the lower sensing pin box is lowered, leaving the pairs of contacts closed because of the latched pins in the lock box, and the card is ejected from the frame 122 by ejecting rollers 128 which deliver the card to a receiver 130 where it is deposited on top of the used card stack.

The reader thus is capable of reading out simultaneously all of the information inscribed on the punched card and does not, like the card punch, have to read out such information sequentially one column (circuit) at a time. Accordingly, the electric wires (see FIG. 4D) leading to the card reader include a live and a return (ground) lead for the cycle pulse that actuates the clutch 110, a live and a return lead for energizing the motor 108 and a live and a return lead for every pair of grid coordinates. The various operations are under the control of a sequencing switch. Inasmuch as the verification holes at grid positions $1_9$, $2_9$ . . . $89_9$, $90_9$ are not used to store or transmit information, there will only be 450 lead wires and one common return wire connected to the sensing switch box 126.

Referring to the console 48 we have remarked earlier that it contains all of the manual controls, these constituting the plurality of individual manually operable units 54 for the different circuits and the function controls on the keyboard 56. More specifically, the keyboard 56 is provided with a "stand-by" push button 132 (FIGS. 4A and 6) for a momentary switch $SW_a$, a "record" push button 134 for a momentary switch $SW_b$, a "duplicate" push button 136 for a momentary switch $SW_c$, a "read" push button 138 for a momentary switch $SW_d$, a "card" push button 140 for a momentary switch $SW_e$, a "record skip" push button 142 for a momentary switch $SW_f$, a "manual-auto" lever 144 (FIGS. 4E and 6) for a two-pole double-throw switch $SW_g$, a "manual" push button 146 for a momentary switch $SW_h$, a "read skip" push button 148 (FIGS. 4D and 6) for a momentary switch $SW_i$, a first "fader blackout" lever 150 (FIGS. 4E and 6) for a double-pole double-throw switch $SW_j$, a second "fader blackout" lever 152 for a double-pole double-throw switch $SW_k$, a "read out" control knob 154 (FIG. 6) for a multiple selection double-pole switch $SW_n$, a "manual blackout" lever 156 (FIG. 6) for a single-pole single-throw switch $SW_o$ (FIG. 4C), a "fader" handle 158 (FIGS. 4E and 6) for a variable auto transformer $TR_a$, and a "manual master" handle 160 for another variable auto transformer $TR_b$ (FIG. 4C).

The plural individual manually operable units 54 (FIGS. 11–13) are suitably physically mounted on the console side-by-side, as shown in FIG. 6, and are wired in the control system. Each said unit has certain manual controls, these constituting a circuit selector switch lever 162 (FIG. 11) for a single-pole, plural position switch $SW_{m_1}$* (FIG. 4C), and a manual control lever 164 (FIG. 11) for a multiple pole coding switch $SW_{p_1}$ (FIG. 4C).

The mechanical details of a typical individual manually operable unit 54 are shown in FIGS. 11, 12 and 13. From these drawings it will be clear that each said unit includes an electrically non-conductive casing 166 which conveniently may be fashioned by molding from a synthetic resin, e.g., a phenol formaldehyde condensation resin, so that it will not be susceptible to deformation in the event any piece of electrical equipment becomes overly warm. For lightness and convenience each casing is open at one side, that is to say, each casing comprises one broad side wall and one narrow boundary wall constituting a flange extending around the periphery of the side wall and defining with said side wall a hollow space open at one side, this side being closed by the abutting side wall of the next unit. Within this hollow space we mount all of the various pieces of equipment which jointly comprise the unit 54. In operation several of these units are arranged side-by-side in a horizontal stack so that an operator has at his fingertips the various manual control means for each of the circuits.

One of the elements caried by each of the units is the single-pole four-throw switch $SW_{m_1}$ (FIG. 4C). The housing 168 (FIG. 11) for this switch is located immediately in back of the front portion of the peripheral wall

---

* The numeral subscripts are employed herein to denote electrical elements which are singular to individual control circuits as distinct from electrical elements which are common to all of the control circuits. It thus will be appreciated that where such subscripts appear, as in the case of $SW_{m_1}$, there actually are a large number of such switches, $SW_{m_1}$ . . . $SW_{m_{90}}$, one for each of the individual circuits. With the particular card punch and card reader hereinbefore referred to, there can be as many as ninety individual circuits and there, therefore, can be as many as ninety of each of the electrical elements having numeral subscripts.

of the unit, said wall being formed with an elongated recess (not shown) to permit the lever 162 to extend therethrough and thereby be conveniently located for access at the front of the unit near the keyboard 56. The operator can shift this lever to any one of four different positions, i.e., an uppermost position 1, a lowermost position 4, and two intermediate positions 2, 3.

Also carried by and within the casing 166 is an indicator drum 170 journalled on a pin 172 extending from the side wall. The periphery of the drum projects through a slot 174 in the adjacent portion of the peripheral wall of the casing and an index marker 176 is located on the exterior surface of said wall to be read against numbers on the drum.

A pilot light 178 (see also FIG. 4C) is disposed within the casing 166 at some suitable point, e.g., below the drum 170. Said light is directly in back of an opening in the peripheral wall so that the operator can ascertain when the light is energized. Moreover, we place in the aforesaid opening a translucent button 180 carrying a numeral so that when the pilot light is illuminated the operator can identify the particular light.

There also is provided within the casing 166 a second drum 182 mounted on a stud 184 carried by the peripheral wall of the casing. The two drums 170, 182 are connected for mutual rotation, as by a cable 185, optionally a string, which is trained about both of the drums and is guided from one drum to another by a series of idler pulleys 186, 188, 190, rotatably mounted on the peripheral wall. A helical tension spring 192 is inserted in the cable to maintain the same under tension, this arrangement being inexpensive and utilizable in the present circumstances since neither drum experiences a full 360° rotation.

A manual control lever 164 is operationally integral with the drum 182 and extends from the drum through a slot in the peripheral wall so as to be accessible for manipulation exteriorly of the unit 54. Mounted on the drum for rotation therewith is one of the elements of the multiple throw coding switch $SW_{p_1}$ (FIG. 4C) which for convenience is sometime referred to hereinafter as the "analog-digital converter." This element constitutes a plate 194 (see also FIG. 4C) of electrically nonconductive material on which there is superimposed, e.g., by stencil printing, a complex electrically conductive pattern 196 which will be described in detail shortly hereinafter, since its description is simpler to comprehend if its function and the element with which it cooperates first are explained.

The switch $SW_{p_1}$ includes as its second element a brush assembly 198 consisting of a block 200 of insulating material which is made fast to the broad side wall of the casing 166 and a series of brushes, e.g., flat cantilever springs 202, 204, 206, 208, 210, 212 and 214. Each spring bears a contact at its free end, said contacts riding on the plate 194 in the zone of the pattern 196.

Before describing the operation of the coding switch $SW_{p_1}$, it first is necessary to understand that each unit 54 is provided with individual voltage varying means, such, for instance, as a manually operable potentiometer $P_1$ (FIGS. 4C and 11).

This potentiometer at a certain stage of the operation of the control system has its resistance value varied by hand and it is the function of the switch $SW_{p_1}$ to transduce the setting of the potentiometer $P_1$, and more specifically the angular position of its arm, into an electric signal, e.g., a code, of a nature such that when the code is fed into a translator relay matrix, hereinafter to be described, the matrix will assume an equivalent setting of an equivalent potentiometer. In other words, the switch $SW_{p_1}$ is in effect a translator which converts the analog value of the setting of the manually operable potentiometer into a code signal, herein shown as a five digit binary cycle permuted code signal.

To effect the foregoing operation the pattern 196 constitutes essentially five tracks, 216, 218, 220, 222 and 224, of control areas which are adapted to be contacted by the cantilever spring brushes 204, 206, 208, 210, 212. Each track of control areas is arranged in an arc, the arcs being concentrically disposed about the stud 184. All of the conductive control areas of all the tracks are mutually interconnected so that they are at the same potential. However, the conductive control areas in each track are discontinuous, that is to say, discrete, there being a non-conductive control area between each two conductive control areas of every track. The tracks are so mutually interrelated that each track has one-half the number of control areas of the next track, and so that the control areas in each track are twice the angular length of the control areas in the next track. This can be better appreciated by examining the control areas in detail.

Thus, considering first the track 216 associated with the brush 204, there are in it sixteen conductive control areas and sixteen non-conductive control areas, making in all thirty-two control areas. The angular length with respect to the stud 184 of each of these control areas is identical, so that there are thirty-two positions of this track with respect to its associated brush, and as the track moves past the brush, there alternately will be an electric connection between the pattern 196 and the brush and a break in such connection.

The next control area track 218 is associated with the brush 206. It has eight conductive control areas and eight non-conductive control areas, each being twice as long angularly as the control areas in the track 216. The remaining tracks 220, 222 and 224 have progressively lesser numbers of double-sized control areas, the track 220 having eight control areas of which four are conductive and four non-conductive, the track 222 having four control areas, of which two are conductive and two non-conductive, and the track 224 having two control areas of which one is conductive and one is non-conductive. From the foregoing it will be appreciated that when the plate 194 is in any given angular position with respect to the brush assembly 198, each track of control areas and its associated brush will either make or not make a conductive contact, depending upon the particular pattern 196 that is present, and a binary code thereby is formed which is distinctive, i.e., unique or peculiar, to the particular angular orientation, i.e., position, of the plate 194 at such time.

In addition to the five tracks 216, 218, 220, 222, 224 of control areas, we provide a sixth track 226 of alternately conductive and non-conductive areas radially outwardly of the track 216, said last track having the greatest number of areas. This sixth track constitutes, in effect, an electrical detent the purpose and operation whereof will be made clear hereinafter. Said sixth track has one conductive area for each singular position of the switch $SW_{p_1}$, in this instance thirty-two, there being one non-conductive area between each pair of adjacent conductive areas. The width of each of the conductive areas in the sixth track is somewhat less than the width of the control areas in the adjacent track 216, it being noted that although the drawings illustrate the conductive and non-conductive areas of the sixth track as being of equal angular lengths, this is simply a coincidence inasmuch as all that is required is that the conductive areas of the sixth track be somewhat narrower than the equal length conductive and non-conductive areas of the first track. The sixth track is associated with the spring brush 202.

Finally, the switch $SW_{p_1}$ includes an arcuate contact strip 228 which is associated and constantly in engagement with the spring brush 214. This contact strip derives potential from the brush 214 and through the pattern 196 brings a uniform potential to all of the conductive control areas in the several tracks described above.

It will be appreciated from the foregoing as well as from visual inspection of the pattern 196, that in one extreme angular position of the plate 194 with respect to the brush assembly all of the conductive areas engage their respective spring brushes, and that in the next position all of the conductive areas engage their spring brushes, except for the track 216. In the next position, a conductive area in the track 216 again engages the brush assembly, but there is a break in the connection between the track 218 and the brush assembly, etc. It is in this manner that we translate the analog position of the manual potentiometer $P_1$ and therefore of the plate 194 to a five digit binary cyclic permuted code set of signals.

Each individual circuit selector switch $SW_{m_1}$ . . . (FIG. 4C) has three or four positions. In the embodiment of our invention shown in the drawings we have illustrated four positions, these being an "off" (number 4), a "manual or independent" (number 3), a "normal" (number 2) and a "correction" (number 1) position. However, as will soon be appreciated, the "manual" position may be eliminated, if desired, and the "correction" position used for manual control or emergency operation.

When a switch $SW_{m_1}$ . . . for any given individual circuit (there is one of these switches for each individual circuit) is in the "off" position (indicated by the reference numeral 4 in FIG. 4C), the power unit for the associated load will remain inoperative regardless of the stored information for controlling this power unit and regardless of the setting of the manually operable potentiometer $P_1$ of the associated control unit 54. In said position the relay $RY_{f_1}$ (FIG. 4D) (one for each individual circuit) is energized. Energization is by connection to a pair of D.C. terminals, to wit, a positive D.C. terminal 230 (FIG. 4A), and a negative D.C. terminal 232. Inasmuch as a large number of the components of our lighting control system derive their energization from this D.C. source of power, we have for convenience drawn a network of positive buses from the positive D.C. terminal 230, all of this network being denoted by the reference character 234, and, for the purpose of easy recognition, we have illustrated the positive bus network with solid heavier-than-normal lines. In like manner the negative bus network has been denoted by the reference numeral 236 and is illustrated with broken heavier-than-normal lines. When the tongue 238 (FIG. 4C) of the switch $SW_{m_1}$ is in number 4 position, it connects the negative bus 236 to a lead line 240 (FIGS. 4C and 4D) that runs to a terminal of the actuating coil of the relay $RY_{f_1}$ the other terminal of which is connected to the positive bus 234.

When the switch $SW_{m_1}$ is in the manual or independent position (indicated by the reference numeral 3 in FIG. 4C), the potentiometer $P_1$ is connected to feed a manually regulated control signal (provided the switch $SW_0$ is closed) to the associated power unit. The analog-digital converter is mechanically connected to the arm of this potentiometer, but the output circuit for the converter is electrically broken. This position is used for individual manual control of the load, e.g., a lighting unit regulated by the specific circuit, and is under the further control of the manual master transformer $TR_b$. The transformer $TR_b$ is an autotransformer connected to an A.C. source of power supply, e.g., between a ground 242 and an A.C. terminal 244. The tap 246 of the transformer $TR_b$ is changeable so as to provide a variable voltage between this trap and ground. Ground and said tap are connected to the primary 248 of a step-down transformer $TR_c$. The secondary 250 of the transformer $TR_c$ has one terminal connected to ground and the other terminal connected by a lead line 252 to the manual black-out switch $SW_0$. Said switch, when closed, feeds potential from the step-down transformer to a manual master bus 254 from which lead lines, such as the lead line 256, carry potential to one terminal of each of the various manually operable potentiometers $P_1$ . . . . In this fashion the single master autotransformer $TR_b$ simultaneously will control all of the individual manually operable potentiometers $P_1$ . . ., the switches $SW_{m_1}$ . . . of which are in number 3 position.

The manual or independent position may be used for emergency control in addition to normal manual control for setting the proper preset lighting value in the event that all or any of the parts of the automatic system fail. In addition, this position can be used when it is desired to control one or two individual circuits manually while the bulk of the system is under automatic control. It thus provides an optional "override" of the more sophisticated portions of the circuit under code-signal control. When only a three position selector switch, $SW_{m_1}$ . . ., is used, this "manual," i.e. independent, position is combined with the "correction" position heretofore mentioned. In manual or independent position the tongue 238 connects the negative bus 236 with a bus 258 (FIGS. 4C and 4D) that runs to one terminal of an actuating coil 260 for the relay $RY_{e_1}$ (FIG. 4D).

When the switch $SW_{m_1}$ is in the normal position (indicated by the reference numeral 2 in FIG. 4C), the associated individual circuit is ready for automatic operation, i.e., ready for presetting, recording, or reading back information. During recording, digital information is electrically transmitted to the card punch, although the individual associated power unit which feeds the individual associated lighting load is being controlled by the manually operable potentiometer $P_1$. This provides smooth control for visual setting of the lighting load. While information is being read back from a card into a translator relay matrix during reading operations, the manually operable potentiometer $P_1$ is electrically inoperative and the control coded signals are transmitted by the card reader directly to the translator relay matrix in digital form for decoding. The manual master $TR_b$ is also electrically inoperative for this individual circuit. At such time the handle 158 (FIGS. 4E and 6) for the fader transformer $TR_a$ (FIG. 6), as soon will be seen, controls all the individual circuits, that are in normal position, from preset to preset during its regular, i.e., automatic, operation. The operation of the control system is fully automatic save for the timing of the cycles which is regulated by the fader handle.

When the switch $SW_{m_1}$ is in the correction position (indicated by the reference numeral 1 in FIG. 4C), the tongue 238 of said multi-throw switch connects the negative bus 236 to a bus 262 that runs to the actuating coil 237 of a relay $RY_{b_1}$. This position is used when it is desired to make a correction to a scene preset, information for which has been transmitted to a translator relay matrix and thence into the power unit. If a circuit error is present on a punched card, the selector switch $SW_m$ for that circuit is set at the correction position and the associated manual potentiometer P turned to the correct position. The card in the card reader is then duplicated by the card punch, as will be described hereinafter, with the exception of the circuit or circuits which have had the switches $SW_{m_1}$ . . . in correction position. Information for these is punched in accordance with the setting of the manually operable potentiometers $P_1$ . . . and hence the analog digital converters associated with these potentiometers $P_1$ . . . which override the incorrect card information. As the control of the power units during this duplication operation is still in analog, it will be appreciated that the correction settings of the switches $SW_{m_1}$ . . . provide the same functions as that of the manual position hereinabove described, plus the additional override of the digital information. It is for this reason that the correction position may, if desired, be used for manual control or emergency operation, and the manual position eliminated.

In the specific individual circuit shown in FIG. 4, there are two translator relay matrices $M_{A_1}$ and $M_{B_1}$ (FIG. 4F), each of these being identical, in essence, with the relay translator matrix 34 of FIG. 3. Two such matrices are utilized since, as noted heretofore, one matrix will be set to the next scene in advance while the second matrix is functioning to control the associated power unit of the existing scene and thereafter the first matrix will be used for control and the second matrix for preset, etc. The matrix $M_{A_1}$ includes a pair of resistors $$R_{1_{A_1}}, RR_{1_{A_1}}$$

of like value (the first susbcript denotes the particular resistor in the matrix, the second subscript denotes the particular matrix, and the last subscript denotes the particular individual circuit), a second pair of resistors $$R_{2_{A_1}}, RR_{2_{A_1}}$$

of like value and twice the resistance value of the resistor $$R_{1_{A_1}}$$

a third pair of resistors $$R_{3_{A_1}}, RR_{3_{A_1}}$$

of like value and twice the resistance value of the resistor $$R_{2_{A_1}}$$

a fourth pair of resistors $$R_{4_{A_1}}, RR_{4_{A_1}}$$

of like value and twice the resistance value of the resistor $$R_{3_{A_1}}$$

and a fifth pair of resistors $$R_{5_{A_1}}, RR_{5_{A_1}}$$

of like value and twice the resistance value of the resistor $$R_{4_{A_1}}$$

One set of resistors $$R_{1_{A_1}}, R_{2_{A_1}}, R_{3_{A_1}}, R_{4_{A_1}}, R_{5_{A_1}}$$

are connected in series. The other set of resistors $$RR_{1_{A_1}}, RR_{2_{A_1}}, RR_{3_{A_1}}, RR_{4_{A_1}}, RR_{5_{A_1}}$$

likewise are connected in series. The two resistors $$R_{5_{A_1}}, RR_{5_{A_1}}$$

have a common point of connection 264 which constitutes the tap connection of the equivalent potentiometer. The free ends of the resistors $$R_{1_{A_1}}, RR_{1_{A_1}}$$

are adapted to have voltage applied thereto, one of these ends being connected to ground.

The matrix $M_{B_1}$ is identical to the matrix $M_{A_1}$.

Each pair of like resistors R, RR has a relay $RY_y$ which shunts one or the other of the pair and leaves the second member of the pair unshunted. The relays $RY_y$ associated with the matrix $M_{A_1}$ are denoted by the reference numeral $RY_{yA}$ and those associated with the matrix $M_{B_1}$ by the reference numeral $RY_{yB}$. In addition, the individual relays are specifically identified by numeral subscripts to indicate the resistors $R_1$, $R_2$, etc. with which they are associated; and still further, a second numeral subscript is used to indicate that each of these relays is duplicated for each of the individual control circuits. That is to say, the relay in the first individual control circuit which governs the selective shunting of the first pair of resistors $$R_{1_{A_1}}, RR_{1_{A_1}}$$

in the matrix $M_{A_1}$ is denoted by the reference numeral $$RY_{yA1_1}$$

the same relay (not shown) in the second individual control circuit would be denoted by the reference numeral $$RY_{yA1_2}$$

and the relay in the first individual circuit which governs the second set of resistors in the matrix $M_{A_1}$ is denoted by the reference numeral $$RY_{yA2_1}$$

Each of the $RY_{yA}$ and $RY_{yB}$ relays operates in a similar fashion so that a description of one of them will suffice.

Referring to the relay $$RY_{yA1_1}$$

it controls what amounts to two single-pole single-throw switches which can effectively shunt in a selected manner either one, but not both, of the resistors $$R_{1_{A_1}}, RR_{1_{A_1}}$$

More specifically, said relay has three sets of contacts, one being normally closed and the other two being normally open. The normally closed pair of contacts is indicated by the reference numeral $$3_{yA1_1}$$

denoting that it is the third pair of contacts of the relay $RY_y$ in the $M_A$ matrix and is associated with the resistors $R_1$, $RR_2$ in the first of a series of individual control circuits. The same pair of contacts (not shown) for the second of the series of individual control circuits would be indicated by the reference numeral $$3_{yA1_2}$$

The lead lines 266, 268 from the pair of contacts $$3_{yA1_1}$$

run to opposite sides of the resistor $$R_{1_{A_1}}$$

so that when the relay $$RY_{yA1_1}$$

is idle, the pair of contacts $$3_{yA1_1}$$

are closed and shunt the resistor $$R_{1_{A_1}}$$

The second pair of contacts $$2_{yA1_1}$$

are normally open and are connnected by lead lines 270, 272 to opposite sides of the resistor $$RR_{1_{A_1}}$$

so that so long as the relay $$RY_{yA1_1}$$

is idle, this latter resistor is unshunted. Obviously, energization of the relay $$RY_{yA1_1}$$

will reverse the shunting conditions of the pair of resistors $$R_{1_{A_1}}, RR_{1_{A_1}}$$

There also is a third pair of normally open contacts $$1_{yA1_1}$$

the function of which will be discussed hereinafter.

From the foregoing, it will be apparent that when a suitable set of code signals is fed to the relays of either of the matrices $M_{A_1}$, $M_{B_1}$, the various resistors R, RR of this matrix will be connected in a manner such as to assume a predetermined equivalent setting of an equivalent potentiometer.

There are four principal methods of operation of our lighting control system, and there are four push buttons 132, 134, 136, 138 (FIGS. 4A and 6) on the keyboard 56 to set up the proper relay paths for these methods of operation. To provide complete protection for the mechanisms and to eliminate possible errors on the part of the operator, certain limitations also are imposed. A brief summary of the operations will clarify the functions of the controls and simplify the more detailed description that follows.

In "stand-by" operation, any one of the individual circuits may be controlled by means of the individual manually operable units 54 (FIGS. 6 and 11) and specifically the manually operable potentiometers $P_1$ . . . (FIGS. 4C and 11). However, neither of the drive motors 64 (FIG. 8), 108 (FIG. 7) in the card punch or card reader is in operation, and none of the automatic actions can be initiated.

In "record" condition, the card punch 50 (FIG. 8) is ready for operation. Cards (FIG. 10) can be punched in accordance with the settings of the individual manually operable potentiometers $P_1$ . . . which are at the moment in control of the actual lighting loads. The cards thus represent the actual scene presets as they are established. Blank cards also may be fed through the card punch without being perforated if the same should be desired. As many duplicate cards may be made of the preset as the operator may require. Changes may be made in the individual manually operable potentiometers $P_1$ . . . and new cards may be punched containing these changes. The fader $TR_a$ (FIG. 4E) is electrically cut out and the mechanism of the card reader 52 (FIG. 7) is inoperative.

The "read" condition energizes the mechanism of the card reader 52 and de-energizes the mechanism of the card punch 50. In the read operation, readings on a card in the reader will be converted to control voltages from equivalent potentiometers (the translator relay matrices) and applied to control the power units which feed the sundry lighting loads. Cards in the reader can be read out sequentially or skipped at will. The sequencing can be accomplished automatically by operation of the fader handle 158 (FIGS. 4E and 6) alone or it can be done manually while the fader handle is at one or the other of its two limits of travel. In addition, any preset can be faded into or out of a black-out.

The "duplicate" operation energizes the mechanisms of both the card punch 50 and the card reader 52. This permits transfer of information from a card in the reader to the punch with consequent duplication of that card in the punch. Any circuit signals on the card being scanned may be corrected by the individual controls, i.e., the manually operable potentiometers $P_1$ . . . , and these corrections will be introduced on the new car being made while the remaining signals are duplicated. Up to the full complement of signals may be checked by moving selected single-pole plural-position switches $SW_{m_1}$ . . . (FIG. 4C) from their No. 1 correction positions to their No. 2 normal positions, thus checking the card signals against the corrected signal. In this condition, automatic sequencing cannot be performed.

In any of the four mentioned conditions of operation, the condition of any individual control circuit may be monitored. In any of said conditions, the manual master $TR_b$ can be selectively used to control any or all of the individual circuits. The control signals may be interrupted in any individual circuit. The manual master black-out switch $SW_0$ may be used.

From the foregoing descriptions, it is evident that there are two principal functions of the master console, i.e., the control center. These are, firstly, recording information and, secondly, recalling that information. The individual steps in these processes can now be considered.

To record a given scene preset or set-up, the individual circuit selector switches $SW_{m_1}$ . . . (FIG. 4C) are placed in their normal (No. 2) positions, and the individual manual circuit controls, i.e., the potentiometers $P_1$ . . . , are moved to their desired positions in accordance with the instructions issued by the director who is staging the production. The record push button 134 (FIG. 4A) for the momentary switch $SW_b$ is depressed, thus providing stand-by power to the card punch 50. The circuit conditions existing at any given moment can be recorded upon order of the proper person, e.g., the director. When he gives such order, the operator depresses the card push button 140 (FIG. 4A) for the momentary switch $SW_e$. The card punch then scans the conditions existing at that time in the various individual circuits as digitally transduced by the analog-digital converters $SW_{p_1}$ . . . (FIG. 4C) and punch-records them by a five-digit binary cyclic permuted code on a card 60 (FIG. 10). Each scene set-up or preset is treated in the same manner, the punched cards being ejected into the card receiver 102 (FIG. 8) in order or preset or set-up and numerically identified by a stamp in one corner. Should the number of individual circuits to be controlled in the system exceed the physical limitations of an individual card, in this instance more than ninety, additional cards are inserted sequentially and punched accordingly. Our system is in no way limited by the number of individual circuits which can be accommodated on a single card.

To recall the settings, i.e., information, which has been recorded on the punched cards, the stack of punched cards is lifted from the card punch receiver 102 and placed in the same order in the card reader feed magazine 104 (FIG. 7). In both the punch and reader cards are withdrawn from the bottom of the feed stack and deposited on the top of the ejection stack. Thus, they remain in their original order unless deliberately disturbed.

Now the "read" push button 138 (FIG. 4A) for the momentary switch $SW_d$ is depressed. This de-energizes the card punch and places the card reader 52 in stand-by condition. In normal automatic operation with the "manual-auto" lever 144 (FIG. 4E) in "auto" (right-hand as viewed in FIG. 6) position and with the fader handle 158 (FIG. 4E) at either one of its limits of movement, the first, i.e., the bottom, punched card in the feed magazine 104 (FIG. 7) will be placed in the read-out position in the frame 122 and will be read into the translator relay matrices $M_{A_1}$ . . . (FIG. 4F) or $M_{B_1}$ . . . corresponding to the opposite position of the fader handle. That is to say, if the fader handle is in its up position (FIG. 6), which we arbitarily denote as its A position, the information from the card in the read-out frame will be read into the $M_{B_1}$ . . . translator relay matrices (FIG. 4F) and vice versa. By movement of the fader handle to its opposite limit, all of the individual control circuits will fall under the regulation of the previously set translator relay matrices which have been arranged in a predetermined pattern by the first card. At the moment the fader arrives at the aforesaid opposite limit, the first preset card is ejected to the card receiver 130 (FIG. 7) and the second card fed from the feed magazine 104 into the read-out position in the frame 122. Said second card is read into the other translator relay matrices while the information from the first card is retained by the first translator relay matrices.

From this point onward each time the fader handle traverses from one limit of its travel to the other, the individual circuit conditions change in exact proportion from those set into one group of translator relay matrices to those set into the other group of translator relay matrices and back again. Each time a limit of travel is reached, one card is rejected from the read-out frame 122 and a new one is fed into the frame and read into the group of translator matrices not then being used for control purposes. If the control system is such as to require more than one card per set-up i.e., preset, additional cards are sequentially cycled through the card reader for each motion of the fader handle, i.e., two, three or more cards will be fed through the card reader, each time the fader handle is moved, and will be read into the translator matrices, thus duplicating operation of the card punch. If at any time it is desired to fade into or out of black-out, a blank card is inserted in this position in the stack.

A counter 274 (FIG. 6) is also provided on the master control keyboard 56 to indicate the numerical sequence of the particular preset or set-up then in being. This counts the card reader sequence and permits an operator to determine the setup in the reader at any given time. A lever 276 controls a switch which supplies electric power to the counter circuit so that the same may be energized or de-energized at will.

The skip buttons 142 (FIGS. 4A and 6), 148 (FIGS. 4D and 6) are located in both the "record" ("punch") and "read" displays of the master control keyboard 56 for the purpose of omitting cards from the automatic operation. In the card punching operation, depressing the record-skip button 142 will merely send a blank card through the card punch 50. In the reading operation, the punched card to be omitted will be read, but because the fader handle has not moved from its original limit, the next card set-up will be read into the same group of translator relay matrices thereby causing the omitted set-up to be "forgotten," i.e., cancelled, before it is used.

Our lighting control system also includes provision for advancing a card under manual control and at the same time preventing the automatic advance initiated by movement of the fader handle 158 (FIGS. 4E and 6) as described above under the operation of the reader. The "manual-auto" lever 144 is set in its "manual" position. This permits the fader to be moved back and forth at will without advancing a card and thereby to hold two set-up, i.e., preset, memories in the translator relay matrices as long as may be desired. By depressing the "manual card advance" button 146 while the fader is at one of its limits, the card in the reader will be ejected and a new card inserted and read.

As a trial or an emergency black-out when no blank card is in the reader stack, a fade may be made to or from black-out by throwing the appropriate black-out levers 150, 152 adjacent to the fader handle 158.

Assuming that a correction is necessary to a set-up which has been read into a group of translator relay matrices and individual control circuits by a punched card, the first information required is the setting of the individual circuit or circuits to be corrected. Although a card can be read and translated visually by an operator who is familiar with the binary cyclic permuted code, a more direct method is preferable. After the lighting equipment has been set in accordance with a card preset which is to be corrected, the duplicate button 136 is depressed. The circuit conditions may then be read by means of the master circuit selector switch $SW_n$ (FIG. 4D) which is operated by the control knob 154 (FIG. 6) and a voltmeter M (FIG. 4D) read-out dial 278 or other suitable display on the keyboard 56. The individual controllers $P_1$ . . . (FIGS. 4C and 11) of the circuits to be corrected are then positioned in accordance with the read-outs and their circuits selector switches $SW_{m_1}$ . . . are placed in the correction position No. 1. The said circuit controllers $P_1$ . . . are next set to their corrected positions to be employed and the ensuing signals will override those previously set by the punched card. Depressing the card button 140 (FIG. 4A) then will cause the card punch 50 to produce a new card duplicating the old one in the card reader, but corrected by the overriding signals in those individual circuits in which the correction controls are set in No. 1 position. In the same fashion, any number of duplicates can be made as required.

The master console may include any other controls and displays as may desirable, for instance, a system master key switch 280, a console light control switch 284 and pilot lights. All function controls, i.e., stand-by, record, duplicate, read, etc., are momentary and pilot lights are provided to indicate which are operative at any given time even though the associated push button has been released.

Since the function buttons are momentary in operation, they perform their operations through a holding network having identical sections for each of the buttons, i.e., a "stand-by" section, a "record" section, a "duplicate" section, and a "read" section. Actuation of any one of these sections will cancel any other section.

The stand-by momentary switch $SW_a$ (FIG. 4A) operated by the momentary stand-by push button 132 includes two normally open pairs of contacts $1_{SW_a}$, $2_{SW_a}$. Closing contact $1_{SW_a}$ energizes a circuit from the negative bus 236 through a lead line 286 and the actuating coil 288 of a relay $RY_{g_a}$ to the positive bus 234.

The relay $RY_{g_a}$ has three normally open pairs of contacts, $1_{g_a}$, $2_{g_a}$ and $3_{g_a}$, which close when the relay $RY_{g_a}$ is energized. The pair of contacts $1_{g_a}$ are holding contacts. When closed they establish a holding circuit from the positive bus 234 through the coil 288, the normally open but now closed pair of contacts $1_{g_a}$, a lead line 290 and a normally closed pair of contacts $1_h$ of a relay $RY_h$. The latter relay is normally idle so that upon release of the momentary stand-by switch $SW_a$ the relay $RY_{g_a}$ remains energized.

Closure of the normally open pair of contacts $3_{g_a}$ establishes a circuit from the positive bus 234 through a pilot lamp $PL_{g_a}$, a lead line 292 and the normally open but now closed pair of contacts $3_{g_a}$ to the negative bus 236, so as to light the pilot lamp which is on the keyboard 56 and indicate that the push button 132 was the last one depressed.

The pair of contacts $2_{g_a}$ forms part of an electric means for releasing the other function sections of the network, e.g., record, duplicate or read, when the stand-by push button is depressed, the same means performing in a like manner to release the last actuated function section when any other function section is brought into play. Specifically, the pair of contacts $2_{g_a}$ is for energization of the relay $RY_h$. When the push button 132 is depressed, in addition to closing the pair of contacts $1_{SW_a}$, it also mementarily closes the pair of contacts $2_{SW_a}$, thereby establishing, upon immediately subsequent energization of the relay $RY_{g_a}$, a circuit from the negative bus 236, through the closed pair of contacts $2_{SW_a}$, a lead line 293, the then closed but normally open pair of contacts $2_{g_a}$, a lead line 294, a normally closed pair of contacts $1_j$ of a relay $RY_j$, a lead line 296, and an actuating coil 298 of the relay $RY_h$ to the positive bus 234, thus to energize the relay $RY_h$ and reverse its contacts. The relay $RY_h$ has four normally closed pairs of contacts, $1_h$, $2_h$, $3_h$ and $4_h$, and one normally open pair of contacts $5_h$. The pairs of contacts $2_h$, $3_h$, and $4_h$, like the pair of contacts $1_h$, are in the holding circuits of different function sections, so that closing a momentary function switch $SW_a$, $SW_b$, $SW_c$, or $SW_d$ will open the holding circuits of all the relays $RY_{g_a}$, $RY_{g_b}$, $RY_{g_c}$ and $RY_{g_d}$.

The pair of contacts $5_h$, when closed, completes a circuit from the negative bus 236 through said pair of contacts $5_h$, a lead line 300 and an actuating coil 302 of the relay $RY_j$. Relay $RY_j$ has two pairs of contacts $1_j$ and $2_j$, the pair of contacts $1_j$ being normally closed and having been described before in connection with the actuating circuit for the relay $RY_h$, and the pair of contacts $2_j$ being normally open. As just noted, energization of relay $RY_h$ through its normally open pair of contacts $5_h$ energizes relay $RY_j$ an energization of relay $RY_j$ de-energizes relay $RY_h$ thereby releasing all of the momentarily open pairs of contacts $1_h$, $2_h$, $3_h$, and $4_h$, and permitting them to move back to their normally closed positions so as to establish the holding circuit for that function for which the push button was last depressed after having cancelled all the function holding circuits. The relay $RY_j$ remains energized through its normally open, but now momentarily closed pair of contacts $2_j$, the lead line 294, the pair of contacts $2_{ga}$, and the pair of contacts $2_{SWa}$, the relay $RY_j$ thereby remaining actuated as long as the push button for this function is held depressed. As soon as the push button is released and their pair of contacts $2_{SWa}$ are opened, the relay $RY_j$ drops out, i.e., is de-actuated, so that the relays $RY_h$ and $RY_j$ now remain de-energized until the next function push button is depressed. Identical circuitry is provided for each of the momentary switches $SW_b$, $SW_c$, and $SW_d$, as is clear from the wiring diagram.

The stand-by relay $RY_{ga}$, in addition to the three normally open pairs of contacts $1_{ga}$, $2_{ga}$, $3_{ga}$, has two further pairs of contacts both normally open, to wit, $4_{ga}$ and $5_{ga}$. Closing the pair of contacts $4_{ga}$ establishes a circuit from the negative bus 236 through this pair of contacts, which circuit is held closed as long as the stand-by relay is energized, a lead line 304, a lead line 306 (FIGS. 4A and 4B), and an actuating coil 308 (FIG. 4B) of a relay $RY_e$ to the positive bus 234. The relay $RY_e$ has a large number of normally open pairs of contacts $1_e$, $2_e$ . . . , one for each individual control circuit. Inasmuch as the pairs of contacts $1_e$ . . . control identical different individual circuits, only one of said circuits is shown herein. The pair of contacts $1_e$ when closed completes a circuit from the negative bus 236 through contact $1_e$, a lead line 310 (FIGS. 4B and 4C) and the bus 258 (FIGS. 4C and 4D) to the actuating coil 260 (FIG. 4D) of the relay $RY_{e1}$ to the positive bus 234, thereby energizing relay $RY_{e1}$ the contacts of which are in the individual output control circuits for the translator relay matrices $M_{A1}$ and $M_{B1}$ (FIG. 4F). These output circuits will be described in greater detail hereinafter.

Closing the pair of contacts $5_{ga}$ (FIG. 4A) establishes a circuit from the negative bus 236 through said pair of contacts, a lead line 312, a lead line 314 (FIGS. 4A and 4B) and an actuating coil 316 (FIG. 4B) of a relay $RY_k$ to the positive bus 234. The relay $RY_k$ has a large number of normally open pairs of contacts $1_k$, $2_k$ . . . , one for each individual control circuit. As in the case of the relay $RY_e$, the circuit associated only with the pair of individual contacts $1_k$ is shown and is described in detail herein. Closure of the pair of contacts $1_k$ completes a circuit from the negative bus 236, said pair of contacts, the lead line 262 (FIGS. 4B and 4C), and the actuating coil 237 (FIG. 4C) of the relay $RY_{b1}$ to the positive bus 234, thereby to energize said relay $RY_{b1}$. The contacts of this latter relay $RY_{b1}$ are in the individual input control circuits for the translator relay matrices $M_{A1}$ and $M_{B1}$ (FIG. 4F).

The "record" momentary switch $SW_b$ (FIG. 4A) operated by the momentary push button 134 includes two normally open pairs of contacts $1_{SWb}$, $2_{SWb}$. Closing these pairs of contacts energizes an actuating coil 320 of the relay $RY_{gb}$ and de-energizes the previously actuated relay $RY_{ga}$. The relay $RY_{gb}$, in addition to the pairs of contacts $1_{gb}$, $2_{gb}$ and $3_{gb}$ for holding the relay $RY_{gb}$, actuating the cut-out relays $RY_h$, $RY_j$, and energizing the pilot light $PL_{gb}$, respectively, has four additional pairs of normally open contacts $4_{gb}$, $5_{gb}$, $6_{gb}$ and $7_{gb}$, which are closed upon energization of said relay. The pair of contacts $4_{gb}$ is in parallel with the pair of contacts $4_{ga}$, and the pair of contacts $5_{gb}$ is in parallel with the pair of contacts $5_{ga}$ so that when the relay $RY_{gb}$ is activated, the circuits controlled by the pairs of contacts $4_{ga}$ and $5_{ga}$ are energized. Specifically, the relays $RY_e$ (FIG. 4B), $RY_{e1}$ . . . (FIG. 4D), $RY_k$ (FIG. 4B), $RY_{b1}$ . . . (FIG. 4C) are energized.

Closing the pair of contacts $6_{gb}$ (FIG. 4A) energizes an actuating coil 322 of a relay $RY_m$ thereby connected by a lead line 323 between the positive and negative buses.

Closing the pair of contacts $7_{gb}$ energizes a bus $B_{cp}$ from the negative bus 236. The bus $B_{cp}$ is connected to the momentary switches $SW_e$ and $SW_f$, these being controlled respectively by the momentary push buttons 140 and 142, i.e., the "card" push button and the "skip" push button in the record circuit.

When the push button 140 is depressed, it completes a circuit from the negative bus 236 through the normally open but now closed pair of contacts $7_{gb}$, the bus $B_{cp}$, an auxiliary bus 324, the normally open but now closed switch $SW_e$, a lead line 326 (FIGS. 4A and 4B), a normally closed pair of contacts $3_n$ (FIG. 4B) of a relay $RY_n$, a lead line 328, a normally closed pair of contacts $1_n$ of said relay $RY_n$, a lead line 330, a branch line 332, an actuating coil 334 of a relay $RY_0$, and a variable resistance 336 to the positive bus 234, thereby to energize the relay $RY_0$. The relay $RY_n$ drives the stepping switch $SW_1$, the function of which will soon be apparent. When the relay $RY_0$ is energized, it closes the single normally open pair of contacts $1_0$ of said relay, thereby to complete a circuit from negative bus 236 through the closed pair of contacts $7_{gb}$ (FIG. 4A), the bus $B_{cp}$, the bus 324, the switch $SW_e$, the bus 326 (FIGS. 4A and 4B), the pair of contacts $3_n$ (FIG. 4B), the bus 328, the pair of contacts $1_n$, the bus 330, the normally open but now closed pair of contacts $1_0$, a bus 338 and an actuating coil 340 of the relay $RY_n$, thereby to energize said relay. When the relay $RY_n$ is energized, it opens the pair of contacts $1_n$. The pair of contacts $1_n$ is so constructed as to open slightly in advance of the pair of contacts $3_n$, so that milliseconds later the contacts $3_n$ will be opened and the contacts $2_n$ closed. This shunts the switch $SW_e$ (FIG. 4A) by bringing negative potential to the lead line 328 (FIG. 4B) through the pair of contacts $2_n$ directly from the negative bus 236. Thereafter, the pair of contacts $1_n$ and the normally open pair of contacts $1_0$ will intermittently open and close, providing stepping pulses for the stepping switch $SW_1$. The pulse rate is determined by varying the value of the resistor 336.

Closing the momentary switch $SW_f$ (FIG. 4A) will supply a cycle pulse to the card punch via lead lines 342 (FIGS. 4A and 4B) and 344 (FIG. 4B), but will not actuate the stepping switch.

The "duplicate" momentary switch $SW_c$ (FIG. 4A) operated by the "duplicate" push button 136 includes two normally open pairs of contacts $1_{SWc}$, $2_{SWc}$, closure of which upon depression of said push button, energizes the relay $RY_{gc}$ and de-energizes any of the other relays $RY_{ga}$, $RY_{gb}$, or $RY_{gd}$ that previously may have been energized. As the relay $RY_{gc}$ is actuated, it closes all of its pairs of contacts $1_{gc}$ through $8_{gc}$, the first three of these forming the holding circuit for said relay $RY_{gc}$, actuating the cancelling circuit for the other $RY_g$ relays and energizing the pilot light $PL_{gc}$, respectively.

Closure of the pairs of contacts $4_{gc}$, $5_{gc}$, respectively, energizes the bus $B_{cp}$ and the relay $RY_m$ from the negative bus 236 through lead lines 346, 348. Closing the pair of contacts $6_{gc}$ energizes a lead line 350 (FIGS. 4A, 4B and 4E), the purpose of which will be detailed hereinafter.

Closing the pair of contacts $7_{gc}$ (FIG. 4A) energizes a lead line 352 (FIGS. 4A, 4B and 4E) from the negative bus 236. The lead line 352 feeds a normally closed pair of contacts $4_q$ (FIG. 4E) of a relay $RY_q$ thereby through a lead line 354 energizing an actuating coil 356 of a relay $RY_r$. Additionally, the lead line 352 is connected to the normally closed pair of contacts $2_p$ of a relay $RY_p$. This energizes a lead line 358 that terminates at a normally open pair of contacts $1_q$. The relay $RY_r$ has a large number of normally open pairs of contacts $1_r$, $2_r$ . . . , one for each of the individual control circuits. Each individual pair of normally open contacts $1_r$ . . . , when closed, energizes through a lead line 360

(FIGS. 4E and 4F) an actuating coil 362 (FIG. 4F) of a relay $$RY_{ccmm.y_{B_1}}$$

having pairs of normally open contacts in the holding circuits of the slow release shunting relays $$RY_{yB_{1_1}}, RY_{yB_{2_1}}, RY_{yB_{3_1}}, RY_{yB_{4_1}}, RY_{yB_{5_1}}$$

for the translator relay matrix $M_{B_1}$. Thus, in the idle position of the relay $RY_q$ (FIG. 4E), the relay $$RY_{comm.y_{B_1}}$$

(FIG. 4F) is energized.

When the relay $RY_q$ (FIG. 4E) is energized as hereinafter described, the normally open pair of contacts $3_q$ close to energize an actuating coil 364 of a relay $RY_s$ through a lead line 366, said now closed pair of contacts, the lead line 352 and the closed pair of contacts $6_{g_c}$ to the negative bus 236. The relay $RY_s$, like the relay $RY_r$, has a large number of normally open pairs of contacts $1_s$, $2_s$ . . . , one for each individual control circuit. The pair of contacts $1_s$, when closed, energizes through lead lines 368, 370 an actuating coil 372 of a relay $$RY_{comm.y_{A_1}}$$

having pairs of normally open contacts in the holding circuits of the slow release shunting relays $$RY_{yA_{1_1}}, RY_{yA_{2_1}}, RY_{yA_{3_1}}, RY_{yA_{4_1}}, RY_{yA_{5_1}}$$

(FIG. 4F) for the translator relay matrix $M_{A_1}$.

Closing of the pair of contacts $8_{g_c}$ (FIG. 4A) applies negative potential from the negative bus 236 to a lead line 374 (FIGS. 4A, 4B, 4C and 4D) which is connected to an actuating coil 376 (FIG. 4D) of a relay $RY_u$, said coil also being connected to the positive bus 234. This relay has only one pair of contacts $1_u$, these being normally open and being in the A.C. power supply line 378 that furnishes power to the card reader motor 108 (FIG. 7).

The "read" momentary switch $SW_d$ (FIG. 4A) operated by the "read" push button 138 includes two normally open pairs of contacts $1_{SW_d}$, $2_{SW_d}$. Closing these pairs of contacts energizes an actuating coil 379 of the relay $RY_{g_d}$ and de-energizes whichever one of the other relays $RY_{g_a}$, $RY_{g_b}$, $RY_{g_c}$ that previously was energized. Said relay $RY_{g_d}$, in addition to its pair of contacts $1_{g_d}$, $2_{g_d}$, $3_{g_d}$ for holding the relay $RY_{g_d}$, actuating the cutout relays $RY_h$, $RY_j$, and energizing the pilot light $PL_{g_d}$, has three additional pairs of normally open contacts $4_{g_d}$, $5_{g_d}$, $6_{g_d}$, which are closed upon energization of said relay. The pairs of contacts $4_{g_d}$, $5_{g_d}$ are connected in parallel with the pairs of contacts $7_{g_c}$, $8_{g_c}$ by lead lines 380, 382, so that energization of the relay $RY_{g_d}$ in this respect functions in the same manner as energization of the relay $RY_{g_c}$ to actuate the relay $RY_r$ (FIG. 4E) or $RY_s$ depending upon the condition of the relay $RY_q$ and also to energize the relay $RY_u$ (FIG. 4D) so as to maintain the card reader motor running.

Closing the pair of contacts $6_{g_d}$ places negative potential on a lead line 384 (FIGS. 4A, 4B and 4E) which is connected to the blades 386, 388 (FIG. 4E) of the two-pole double-throw manual-auto switch $SW_g$. In the indicated position of said switch on the wiring diagram, the blade 388 engages the contact $3_{SW_g}$ to energize the automatic pilot light $$PL_{SW_{g_a}}$$

This is the automatic position of the switch $SW_g$. In said position, the blade 386 engages the contact $1_{SW_g}$, thereby placing negative potential on the lead line 390. Said lead line is connected to one terminal of each of two normally open limit switches $LS_1$ and $LS_2$. Said limit switches are physically located at the opposite ends of travel of the fader handle 158 (FIGS. 4E and 6) so as to be actuated thereby when the fader handle has completed its movement to either of its two extremes.

The switch $LS_1$ (FIG. 4E) is connected by a lead line 392 to an actuating coil 394 for the relay $RY_p$, which in turn is connected to the positive bus 234. In a similar fashion, the limit switch $LS_2$ is connected by a lead line 396 to an actuating coil 398 for the relay $RY_q$ which likewise is connected to the positive bus 234. Thus, when the fader handle reaches either extreme of travel, it will close one or the other of the limit switches $LS_1$, $LS_2$ to energize one or the other of the relays $RY_p$, $RY_q$, providing that the manual-auto switch lever 144 (FIGS. 4E and 6) is in automatic position and that the read push button 138 (FIGS. 4A and 6) is the last one that has been depressed.

Energization of the relay $RY_p$ (FIG. 4E) opens the normally closed pair of contacts $2_p$ and closes the normally open pair of contacts $1_p$, thus placing negative potential on the lead line 400 which serves to hold the relay $RY_p$ through the pair of contacts $2_q$ even after the limit switch $LS_1$ opens during return movement of the fader handle 158. When thereafter the relay $RY_q$ is energized, the normally closed pair of contacts $2_q$ is opened to cancel the holding circuit for relay $RY_p$ and the normally open pair of contacts $1_q$ is closed to complete a holding circuit for relay $RY_q$, this latter circuit being, as heretofore noted, through the normally closed pair of contacts $2_p$. Thus, energization of either relay $RY_p$, $RY_q$ completes a holding circuit for such relay which is broken upon energization of the other relay. In addition, energization of the relay $RY_q$ opens the normally closed pair of contacts $4_q$ and closes the normally open pair of contacts $3_q$ whereby, as observed previously, to transfer energization from the relay $RY_r$ to the relay $RY_s$.

When the switch $SW_g$ is in manual position, the contacts $1_{SW_g}$ and $3_{SW_g}$ are open so that none of the foregoing automatic operations can take place. However, the contacts $2_{SW_g}$ and $4_{SW_g}$ are closed, the first closure preparing the circuit for manual operation under regulation of the push button 146 and the switch $SW_h$. Closing the contact $4_{SW_g}$ energizes the pilot light $$PL_{SW_{g_m}}$$

to indicate that the card reading circuit is under manual control. Closing of the switch $SW_h$ will energize whichever relay $RY_p$, $RY_q$ happens to have its limit switch $LS_1$, $LS_2$ closed in the particular position that the fader handle 158 occupies at the time the push button is depressed.

In addition to the normally open pairs of contacts $1_r$ . . . , the relay $RY_r$ has a single normally closed pair of contacts $x_r$ connecting a lead line 402 (FIGS. 4E, 4B, 4C and 4D) to the negative bus 236. Said lead line 402 runs to an actuating coil 404 (FIG. 4D) of a slow release relay $RY_t$ having a single normally open pair of contacts $1_t$. This pair of contacts is in an energizing circuit for a slow operating relay $RY_x$. In particular, a lead line 408 runs from said pair of contacts to an actuating coil 410 for said relay $RY_x$, the latter being connected to the positive bus 234. The lead line 408 through a lead line 412 (FIGS. 4D and 4C) will, when the relay $RY_t$ (FIG. 4D) is closed, energize the actuating coils 414 (FIG. 4C) of all the transfer relays $RY_{c_1}$ . . . of which there is one for each of the individual control circuits. The pairs of contacts of the relays $RY_{c_1}$ . . . are in the input circuits for the relays of the translator relay matrices $M_{A_1}$, $M_{B_1}$ (FIG. 4F).

It will be observed that the normally open pair of contacts $1_x$ (FIG. 4D) and the normally closed pair of contacts $2_x$ are permanently shunted and are connected to the lead line 416 (FIGS. 4D, 4C, 4B and 4A) which is energized by operation of either the "read" section or the "duplicate" section through the lead line 352 (FIG. 4A) and the pairs of contacts $7_{g_c}$ or $5_{g_d}$.

The description thus far has been concerned with network manipulation of the four sections ("stand-by," "record," "duplicate" and "read") corresponding to the four functions which provide interrelation between the card punch and the card reader. The card punch is self-driven through relay $RY_m$ and a lead line 413 (FIGS. 4A and 4B) and automatically operated except for scanning and initiation of cycling. The card reader also is automatically operated except for initiation of cycling.

The first work operation to be considered is that of the card punch. The circuit for this operation includes the relays $RY_{d_1} \ldots$ (FIG. 4C) (one for each individual control circuit), the pulsing relay $RY_0$ (FIG. 4B) and the stepping relay $RY_n$ which latter mechanically operates the stepping switch $SW_1$. Said switch $SW_1$ is a conventional multi-position, ratchet-positioned, spring-driven, magnetically-reset stepping switch having a rotatable arm 418 that is connected to the negative bus 236 and is intermittently advanced through a shaft 419 by the relay $RY_n$. Said arm will move from the home contact to contact $1_{SW_1}$ to contact $2_{SW_1}$, etc., progressively moving through a series of contacts one for each of the individual control circuits and an additional contact before returning to the home contact. The movement of the arm from contact to contact is intermittent, said arm stepping, as is well known, from one contact to the next each time the actuating coil 340 of the relay $RY_n$ is energized. If the record push button 134 (FIG. 4A) is depressed, it will, through the closed pair of contacts $7_{g_b}$ and lead line $B_{CP}$, bring potential to the switch $SW_e$. If then the record "card" button 140 is depressed, it will close the momentary switch $SW_e$ to energize the pulsing relay $RY_0$ (FIG. 4B), the closure of which in turn will energize the stepping relay $RY_n$ and cause it to move the arm 418 through its first step from the home contact to the contact $1_{SW_1}$ connected to a lead line 420 (FIGS. 4B and 4C) that leads to an actuating coil 422 (FIG. 4C) for the first relay $RY_{d_1}$. At the same time, the rotation of the shaft 419 (FIG. 4B) carrying the arm 418 will mechanically, e.g., by means of a cam on said shaft, open the pair of contacts $3_n$ which is only closed when the switch $SW_1$ is in on the home contact. The same mechanical cam action closes the pair of contacts $2_n$ and will hold them closed until the switch arm 418 returns to the home contact. Thereafter, the arm 418 will in a scanning operation step around its ring of contacts $$1 \ldots \atop SW_1$$

supplying in sequence negative potential to successive relays $RY_{d_2} \ldots$ .

The relay $RY_{d_1}$ (FIG. 4C) has six normally open pairs of contacts $1_{d_1}$, $2_{d_1}$, $3_{d_1}$, $4_{d_1}$, $5_{d_1}$, $6_{d_1}$ . Said pairs of contacts are connected by lead lines 424, 426, 428, 430, 432, 434 (FIGS. 4C and 4B) to card punch buses $CPB_1$, $CPB_2$, $CPB_3$, $CPB_4$, $CPB_5$, $CPB_6$ (FIG. 4B), so that upon energization of the relay $RY_{d_1}$, there is a set of six contacts connected to these card punch buses for the first individual control circuit. When the relay $RY_{d_1} \ldots$ for any particular circuit is energized, it will close the pairs of contacts $$1 \ldots \atop d_1 \ldots$$

for that circuit thereby successively to supply information to the card punch buses $CPB_1 \ldots$ from successive individual control circuits. The card punch bus $CPB_6$ is connected to the solenoid 96 (FIG. 8) which controls the "9" verification punch. The five remaining card punch buses are respectively connected to the "0," "1," "3," "5" and "7" solenoids 96.

Each time pulses are fed to the lead lines 424–434 (FIGS. 4B and 4C) from a group of contacts $$1 \ldots \atop d_1 \ldots$$

(FIG. 4C), and as soon as the solenoids have set up a row of punches and are released upon stepping of the arm 418 (FIG. 4B), the setting bar 92 (FIG. 8) steps to the next column of pins 90.

The stepping operation of the switch $SW_1$ (FIG. 4B) is conventional. When contact $1_n$ is closed as the stepping relay $RY_n$ de-energizes, the pulsing relay $RY_0$ is energized from the negative bus 236, the pair of contacts $2_n$, the lead line 328, the closed pair of contacts $1_n$, the lead line 332, the actuating coil 334, and the variable resistance 336 to the positive bus 234. This closes the pair of contacts $1_0$ to energize the relay $RY_n$ and cause it to move the arm 418 to the next step. Such operation continues with the arm moving from contact to contact to sequentially energize the relays $RY_{d_1} \ldots$ (FIG. 4C) and connect the contacts thereof in sets to the card punch until the arm 418 (FIG. 4B) reaches its home contact, at which time the cam permits the pair of contacts $2_n$ to open and closes the pair of contacts $3_n$. Opening the pair of contacts $2_n$ stops operation of the stepping relay by opening its holding circuit. Closing the contact $3_n$ prepares the stepping relay for another stepping cycle which, however, does not then take place because the button 140 (FIG. 4A) has not been held down so that the momentary switch $SW_e$ is open. It will be understood that the duration of the dwell time of the arm on each contact $$1 \ldots \atop SW_1$$

(FIG. 4B) and the interval between the actuations of the relay $RY_n$ are conveniently adjustable by varying the resistance 336.

The card punch has its cycle automatically initiated at the termination of scanning by engagement of the arm 418 with the next to the last contact of the switch $SW_1$ before the home contact. The ensuing pulse is fed from this contact through lead line 436 to the cycle pulse terminal of the card punch to activate the automatic card handling mechanism of said punch and to create the movement which finally causes all the previously successively set punches 90 (FIG. 8) to form holes in the cards corresponding to the information which has been fed through the card punch buses.

Manual cycling of the punch can be accomplished by pressing the button 142 (FIG. 4A) after either the "record" or "duplicate" button 134, 136 has been depressed. It will be observed that manual cycling without previous setting of the several punches by means of the card punch buses simply will cause the card punch 50 to go through a non-punching, i.e., ineffective, cycle to thereby eject an unpunched card. Thus, the button 142 acts as a card skip button for the card punch.

The second work operation to be considered is that of the card reader 52 (FIGS. 4D and 8). The circuit for this operation includes the relays $RY_v$ (FIG. 4D), $RY_w$, $RY_x$ and $RY_z$, the limit switches $LS_3$ and $LS_4$, and the switches $SW_i$, $SW_j$ (FIG. 4E) and $SW_k$.

When either the "duplicate" punch button 136 (FIG. 4A) or the "read" push button 138 is depressed, the relay $RY_{g_c}$ or $RY_{g_d}$ is energized, closing one or the other of the pair of contacts $7_{g_c}$ or $5_{g_d}$, the net result being to energize the lead line 416 (FIGS. 4A, 4B, 4C and 4D). Thereby, energy is transmitted through the normally closed pair of contacts $2_x$ (FIG. 4D) to a lead line 438 and then through lead lines 440, 442 and normally closed switch $SW_i$, a lead line 444 and a normally closed pair of contacts $2_v$ to an actuating coil 446 of the relay $RY_z$, thereby to energize this relay. The latter relay has two pairs of normally open contacts $1_z$, $2_z$. Closure of the pair of contacts $2_z$ energizes an actuating coil 448 of the relay $RY_v$ through a lead line 450, said closed contacts $2_z$ and a lead line 452 which terminates in the lead line 416 that is connected at this time to the negative bus 236. Simultaneously, closure of the pair of contacts $1_z$ provides a path from an A.C. terminal 454, a lead line 456, the closed pair of contacts $1_z$ and a lead line 458 to a normally open pair of contacts $2_w$.

When the relay $RY_v$ is energized, its pair of contacts $2_v$ in the actuating circuit for the relay $RY_z$ will be opened thereby to de-energize said relay $RY_z$, open the pair of contacts $1_z$ and remove potential from the pair of contacts $2_w$. As the pair of contacts $2_v$ opens, the normally open pairs of contacts $1_v$, $3_v$ close. Closure of the pair of contacts $1_v$ completes a holding circuit for the relay $RY_v$ through the normally closed switch $SW_i$ and the pair of contacts $2_x$ to the negative bus through the lead line 416 and either of the pairs of contacts $7_{gc}$, $5_{gd}$ (FIG. 4A). Closure of the contacts $3_v$ energizes an actuating coil 460 (FIG. 4D) for the slow operating relay $RY_w$, the energizing circuit therefor running from the positive bus 234 through the coil 460, a lead line 462, a lead line 464, the normally open but then closed pair of contacts $3_v$, a lead line 466 and the lead line 452 back to the lead line 416. Operation of the relay $RY_w$ closes its own normally open pair of contacts $1_w$ to hold this relay closed against opening of the relay $RY_v$, the holding contacts connecting said relay back through the lead line 452 to the lead line 416.

When the normally open pair of contacts $2_w$ is closed, a circuit is prepared for supplying a cycle pulse to the card reader. However, this pulse is not yet supplied because the pair of contacts $1_z$ which previously was closed has been opened and it is necessary to re-energize the relay $RY_z$ in order to supply the cycle pulse. The relay $RY_w$ is included in the network to provide a slight time delay and thereby prevent the cycle pulse from being delivered immediately upon closure of the relay $RY_z$.

The relay $RY_x$ provides the cycle pulse, said relay being operated from the lead line 408 upon energization of the relay $RY_t$ which is actuated upon de-actuation of the relay $RY_r$ (FIG. 4E). The relay $RY_x$ (FIG. 4D) is a slow operating relay and therefore is actuated subsequent to actuation of relay $RY_t$ and subsequent to the de-energization of the relay $RY_r$. When the relay $RY_x$ is actuated, it opens the normally closed pair of contacts $2_x$ and subsequently closes the normally open pair of contacts $1_x$. In so doing, it creates a momentary loss of potential on the lead line 438 and therefore opens the holding circuit for the relay $RY_v$ through the pair of contacts $1_v$. However, as soon as the relay $RY_v$ de-energizes, its contacts $2_v$ re-close, thereby re-energizing the relay $RY_z$ through the now closed pair of contacts $1_x$. Energization of the relay $RY_z$ re-closes the pair of contacts $1_z$ to supply a cycle pulse through the now closed pair of contacts $2_w$. To insure proper operation of the foregoing pulse circuit for the card reader 52, the relay $RY_x$ is of a conventional design to provide both slow operation and slow release.

The card reader may be manually cycled by opening the switch $SW_i$. For this purpose, the "read skip" push button 148 is depressed. Opening this switch provides the same momentary interruption in the holding circuit of the relay $RY_v$, through the closed pair of contacts $1_v$, that is necessary to re-energize the relay $RY_z$. The push button 148 may be effectively operated only if either one of the two limit switches $LS_3$, $LS_4$ is open, since these limit switches are connnected in series through lead lines 470, 472, 474 across the switch $SW_i$. The limit switches $LS_3$, $LS_4$ are so physically disposed with respect to the fader handle 158 (FIGS. 4E and 6) that one or the other of said switches will be actuated by said handle at one or the other of its extreme positions, whereby, like the limit switches $LS_1$, $LS_2$, (FIG. 4E) when said handle is at either extreme position one or the other of the limit switches $LS_3$, $LS_4$ (FIG. 4D) will be open.

The switches $SW_j$, $SW_k$, (FIG. 4E) which are operated by the two fader black-out levers 150, 152 on the keyboard 56, (FIG. 6) have a primary function, to wit, supplying power to the resistors R and RR (FIG. 4F) of the translator matrices $M_A$ and $M_B$ of all of the individual control circuits and of removing power therefrom when it is desired to have either an abrupt black-out or to fade to black-out under automatic control. When either one of these levers 150, 152 (FIGS. 4E and 6) is moved to a black-out position and when subsequently the lighting control system is blacked out by moving the fader handle 158 to the position in which the resistors of the translator matrix in control are de-energized so as to create black-out, it will be because of some unforeseen contingency. Therefore, it will be desirable when the fader handle is shifted not to automatically cycle the card reader 52 as above described so as to advance the cards therein.

To prevent such cycling in case of emergency black-out due to operation of the levers 150, 152, the switches $SW_j$, $SW_k$ (FIG. 4E) include normally open pairs of contacts $1_{SW_j}$ and $1_{SW_k}$. The two pairs of contacts are connected in parallel by lead lines 476, 478. In addition, said pairs of contacts are connected in common across the pairs of contacts $1_x$, $2_x$ (FIG. 4D) by lead lines 480, (FIGS. 4E and 4B) 482 (FIGS. 4E, 4F, 4C and 4D). When either the lever 150 (FIGS. 4E and 6) or the lever 152 is moved to black-out position, either the contact $1_{SW_j}$ (FIG. 4E) or the contact $1_{SW_k}$ will be closed to shunt the pairs of contacts $1_x$, $2_x$ (FIG. 4D) whereby energization or de-energization of the relay $RY_r$ (FIG. 4E) will not cause a temporary interruption of the holding circuit for the relay $RY_v$ (FIG. 4D) when either pair of contacts $1_x$, $2_x$ opens. Therefore, if with one of the black-out levers 150, 152 in black-out position, the fader handle is moved to the position corresponding to such black-out lever, no cycle pulse will be fed into the card reader and the cards will remain in the positions they occupied.

The third work operation to be considered is that of what might be referred to as the "encoded information input circuit," this operation constituting a conversion from the analog position of the various potentiometers $P_1 \ldots$ (FIGS. 4C and 11) to the digitally encoded information that will control the various matrices $M_{A1} \ldots M_{B1} \ldots$ (FIG. 4F). The encoded information input circuit is composed of the switches $SW_{p1} \ldots$ (FIG. 4C), the relays $RY_{a1} \ldots$, the pilot lights 178 and the resistors 484.

As indicated earlier, the switch $SW_{p1}$ consists of six tracks 216, 218, 220, 222, 224, 226 (FIG. 13) of alternate conductive and non-conductive areas which cooperate with contact brushes 202, 204, 206, 208, 210 and 212. For convenience in the wiring diagram of FIG. 4C these have been denoted as pairs of contacts $$1_{SW_{p1}}, 2_{SW_{p1}}, 3_{SW_{p1}}, 4_{SW_{p1}}, 5_{SW_{p1}}, 6_{SW_{p1}}|$$

The first five contacts jointly provide the five digit binary cyclic permuted code and the sixth contact is utilized as an electrical detent.

As will be recalled from the description of the track 226, the sixth pair of contacts $$6_{SW_{p1}}$$

only will close when the angular position of the potentiometer $P_1$ is definitely within one of its 32 possible positions. If the potentiometer is near the fringe of one of said 32 positions, the brush 202 will not touch the conductive area on the track 226. Closure of this sixth pair of contacts completes a circuit from the negative bus 236 through said pair of contacts, a lead line 486, the pilot light 178 and the resistor 484 to the positive bus 234. The pilot light is shunted by an actuating coil 487 for the relay $RY_{a1}$ so that closing of the pair of contacts $$6_{SW_{p1}}$$

actuates the relay $RY_{a1}$.

The remaining five pairs of contacts of the switch $SW_{p1}$ are connected by lead lines 488, 489, 490, 491, 492 to the pairs of normally open contacts $1_{a_1}, 2_{a_1}, 3_{a_1}, 4_{a_1}, 5_{a_1}$ of the relay $RY_{a_1}$. Each of these lead lines will be energized when a conductive area on an associated track 216–224 is engaged by an associated brush. Thus, the code signals appear on these lead lines and will be transmitted through the pairs of contacts of the relay $RY_{a_1}$ when said contacts are closed to lead lines 493, 494, 495, 496, 497 respectively. This relay is closed when the contact $$6_{SW_{p_1}}$$

closes.

Said relay $RY_{a_1}$ pulses as the potentiometer $P_1$ turns and turns the pattern 196 with it. However, this pulsing action will not set any function in operation until the "record" or "duplicate" push button 134 or 136 (FIG. 4A) is depressed. It will be observed, moreover, that the switch $SW_{p_1}$ (FIG. 4C) is ineffective to operate for transmission of encoded signals unless a conductive area on the track 226 is lined up with the associated brush. It is for this reason that the track 226 has been referred to as an electrical detent. It also will be observed that proper alignment of a conductive area on the track 226 is indicated by energization of the pilot light 178. The particular angular position of the potentiometer $P_1$ will be denoted by the number indicated on the drum 170 (FIG. 11) then lined up with the index marking. It will be apparent that as the potentiometer $P_1$ is adjusted under the orders of a director, the code signals appearing on the lead lines 488–492 will change and that when finally a particular position is selected, the operator will, if the pilot light 178 then is not lit, slightly change the position of said potentiometer until it is lit, thereby indicating to him that the code signals have been properly set and that the relay $RY_{a_1}$ is energized.

The relay $RY_{a_1}$ (FIG. 4C) has a sixth normally closed pair of contacts $6_{a_1}$, one side of which is connected to the negative bus 236. Said pair of contacts operates to conduct a matrix holding pulse when relay $RY_{a_1}$ is de-energized. The purpose of the same will soon be apparent.

The relay $RY_{b_1}$ is a read-duplicate transfer relay for feeding to the card punch buses $CPB_1, CPB_2, CPB_3, CPB_4, CPB_5$ (FIG. 4B), either the signals derived from the encoding switch $SW_{p_1}$ (FIG. 4C) or those derived from the card reader buses $CRB_1, CRB_2, CRB_3, CRB_4, CRB_5$ (FIGS. 4C and 4D). For this purpose the relay $RY_{b_1}$ (FIG. 4C) includes ten pairs of contacts, to wit, five normally closed pairs of contacts $1_{b_1}, 3_{b_1}, 5_{b_1}, 7_{b_1}$ and $9_{b_1}$, and five pairs of normally open contacts $2_{b_1}, 4_{b_1}, 6_{b_1}, 8_{b_1}$ and $10_{b_1}$, as well as an additional normally open pair of contacts $11_{b_1}$. The normally closed pairs of contacts $1_{b_1}, 3_{b_1}, 5_{b_1}, 7_{b_1}, 9_{b_1}$ connect the buses $CRB_{1-5}$ to lead lines 498, 500, 502, 504, 506 respectively, which are connected to the lead lines 508, 510, 512, 514, 516 respectively. These latter lead lines are connected through the contacts $1_{b_1}, 2_{b_1}, 3_{b_1}, 4_{b_1}, 5_{b_1}$ when closed to the buses $CPB_1, CPB_2, CPB_3, CPB_4$ and $CPB_5$ (FIG. 4B) respectively.

The relay $RY_{d_1}$ (FIG. 4C) also has a normally open pair of contacts $6_{d_1}$ which, when closed, connects bus $CPB_6$ to the negative bus 236 so that every time the relay $RY_{d_1}$ is energized, the "9" verification solenoid will be energized, thus ensuring movement of at least one solenoid regardless of the position of the potentiometer $P_1$. Energization and triggering of any one or more of the solenoids followed by subsequent release thereof, will advance the setting bar one column. Moreover, the provision of a continuous line of punch holes in the "9" row provides a visual check on the proper operation of our system and our card punch.

A second transfer relay $RY_{c_1}$ (FIG. 4C) is included in each of the individual control circuits, the purpose thereof being to connect either one or the other relay matrices $M_{A_1}, M_{B_1}$ (FIG. 4F) to the card reader buses $CRB_1$, etc. 4C). The relay $RY_{c_1}$ has twelve pairs of contacts $$1 \ldots_{c_1}$$

the odd pairs of said contacts being normally closed and the even pairs of contacts being normally open. The first five normally closed odd pairs of contacts $1_{c_1}, 3_{c_1}, 5_{c_1}, 7_{c_1}, 9_{c_1}$ are connected by lead lines 518, 519, 520, 521, 522 (FIGS. 4C and 4F) to the actuating coils of the respective relays $$RY_{y_{A1_1}}, RY_{y_{A2_1}}, RY_{y_{A3_1}}, RY_{y_{A4_1}}, \text{and } RY_{y_{A5_1}}$$

(FIG. 4F). Thereby, when the relay $RY_{a_1}$ (FIG. 4C) is energized, the transfer relay $RY_{b_1}$ is energized and the transfer relay $RY_{c_1}$ is idle, selected ones of the relays $$RY_{y_{A_1} \ldots 1}$$

(FIG. 4F) will be energized corresponding to the pairs of contacts $$1 \ldots SW_{p_1}$$

(FIG. 4C) which are engaged. Moreover, energizing the relay $RY_{c_1}$ will similarly energize selected ones of the relays $$RY_{y_{B_1} \ldots 1}$$

(FIG. 4F) through lead lines 523, 524, 525, 526, 527 (FIGS. 4C and 4F).

The normally closed pair of contacts $11_{c_1}$ (FIG. 4C) will, when the relay $RY_{b_1}$ is energized and the relay $RY_{a_1}$ is idle, transmit energy from the negative bus 236 through the pair of contacts $6_{a_1}$, a lead line 528, the then closed pair of contacts $11_{b_1}$, the lead line 530, the normally closed pair of contacts $11_{c_1}$, the lead line 368 (FIGS. 4C, 4B and 4E) and the lead line 370 (FIG. 4E) to the actuating coil 372 of the relay $$RY_{comm.y_{A_1}}$$

for temporarily holding said relay so that when the system is set to duplicate and the switch $SW_{m_1}$ (FIG. 4C) is in number 1 (correction position), the matrix which has its relays $$RY_{y_{A \text{ or } B_1} \ldots 1}$$

(FIG. 4F) energized will have said relays held as the potentiometer $P_1$ (FIG. 4C) is moved from position to position but will have the holding circuit opened when the proper correction position is reached. In a similar fashion, the contact $12_{c_1}$ is provided to supply a holding signal to the actuating coil 362 (FIG. 4F) of the relay $$RY_{comm.y_{B_1}}$$

via lead line 534 (FIGS. 4C and 4F) when the relay $RY_{c_1}$ (FIG. 4C) is energized.

Alternating current is supplied to the auto transformer $TR_a$ (FIG. 4E) from the power terminal 454 and ground. The same power is supplied to the other terminals of two primary sections of isolation transformers $TR_d, TR_e$. A tap 536 of the fader autotransformer $TR_a$, which tap is controlled by the fader handle 158, is connected by a lead line 538 to the junction between the inner terminals of primaries of the isolation transformers. Thus, as the tap is moved from one extreme position to the other, it will gradually transfer full energization from the primary of one of the isolation transformers, e.g., the transformer $TR_d$, to the primary of the other isolation transformer, e.g., the transformer $TR_e$, or vice versa. This is what is referred to as the fading operation.

The secondaries of the isolation transformers have one set of ends tied together at a common ground. The other ends of the isolation secondaries feed lead lines 540, 542. Thus, the lead line 540 will carry potential when the tap 536 is in the lower position shown in FIG. 4 and the lead line 542 will carry potential when the tap is in the upper position of said figure, potential being smoothly transferred from either lead line to the other when the fader handle is moved from one extreme position to another.

The lead line 540 is connected through the closed pair of contacts $2_{SW_j}$ to a lead line 544 which branches off to the various $M_A$ matrices of the different individual control circuits, and in FIGS. 4E and 4F is connected by a lead line 546 to one terminal of the first matrix resistor $$RR_{1_{A_1}}$$

Similarly, the lead line 542 (FIG. 4E) is connected by the closed pair of contacts $2_{SW_k}$ to a lead line 548 which is connected to all of the $M_B$ matrices and, in particular, is connected to the matrix $M_{B_1}$ by the lead line 550 (FIGS. 4E and 4F), the connection being effected to the first resistor $$RR_{1_{B_1}}$$

Thereby with each of the two black-out levers 150, 152 (FIG. 4E) in non-black-out position, the A group or B group of matrices in the sundry individual control circuits will be energized depending upon the position of the fader handle.

Specific resistors within the fixed ladder potentiometer, i.e., the equivalent potentiometer, are shunted out, depending upon the code signals fed thereto by the card reader or encoding switch, so that the taps 264 (FIG. 4F) of the equivalent potentiometers will provide discrete stepped values of output voltages corresponding to the code signal. The particular output voltage provided by an equivalent potentiometer at any given time will be the same, within pre-established circuit tolerances, as the output voltage of the potentiometer $P_1$ . . . (FIG. 4C) for the analog setting that is the equivalent for the code signal.

The holding circuits for the relays $$RY_{y_{A_1} \ldots 1}$$

(FIG. 4F) were prepared by the relays $RY_r$ and $RY_s$ (FIG. 4E) that were energided upon depression of the "duplicate" or "read" push buttons 136, 138 (FIG. 4A). There energize the relays $RY_{comm.yA}$ (FIG. 4E) and $RY_{comm.yB}$ (FIG. 4F) and place potential on lead lines 551 through the normally open but now closed contacts $1_{comm. y_{A_1}}$, $2_{comm. y_{A_1}}$, $3_{comm. y_{A_1}}$, $4_{comm. y_{A_1}}$, $5_{comm. y_{A_1}}$ (FIG. 4E), or $1_{comm. y_{B_1}}$, $2_{comm. y_{B_1}}$, $3_{comm. y_{B_1}}$, $4_{comm. y_{B_1}}$, $5_{comm. y_{B_1}}$ (FIG. 4F), respectively. An alternate holding circuit which energizes one or the other of the holding relays $$RY_{comm.y_A \text{ or } B_1}$$

and the lead lines 551 (FIG. 4F) includes the pairs of contacts $6_{a_1}$, $11_{b_1}$, $11_{c_1}$ and $12_{c_1}$ (FIG. 4C). Said lead lines 551 feed energy from the negative bus 236 to the normally open pairs of contacts $1_{y_{A_{1_1}}}$, $1_{y_{A_{2_1}}}$, $1_{y_{A_{3_1}}}$, $1_{y_{A_{4_1}}}$, $1_{y_{A_{5_1}}}$ or $1_{y_{B_{1_1}}}$, $1_{y_{B_{2_1}}}$, $1_{y_{B_{3_1}}}$, $1_{y_{B_{4_1}}}$ $1_{y_{B_{5_1}}}$ (FIG. 4F), respectively, which are the holding contacts for such relays $$RY_{y_A \text{ or } B_1 \ldots 1}$$

as may be energized from the card reader (with relay $RY_{b_1}$ (FIG. 4C) de-energized or from the encoding switch $SW_{p_1}$ (with the relay $RY_{a_1}$ energized and the relay $RY_{b_1}$ energized). Inasmuch as there is a temporal instant when the pairs of encoding contacts $1_{a_1}$, $2_{a_1}$, $3_{a_1}$, $4_{a_1}$, $5_{a_1}$ are open before the temporary holding contact $6_{a_1}$ closes and vice versa during energization and de-energization of the relay $RY_{a_1}$, all of the relays $$RY_{y_A \text{ or } B_1 \ldots 1}$$

(FIG. 4F) are of the slow release type to provide a continuity in the output from the translator relay matrices during this transient condition.

Each of the relay matrices $M_{A_1}$, $M_{B_1}$ has a single-wire A.C. output, the other output being connected to ground. The single-wire A.C. output for the matrix $M_{A_1}$ is denoted by the reference numeral 552 (FIGS. 4F, 4C and 4D). and that for the matrix $M_{B_1}$ (FIG. 4F) by the reference numeral 554 (FIGS. 4F, 4C and 4D). Thus, in essence our control system provides three single-wire outputs, these constituting a lead line 556 (FIGS. 4C and 4D) which provides a voltage derived from the individual manual control voltage divider (potentiometer) $P_1$, a lead line 552 (FIGS. 4F, 4C and 4D) which provides a voltage derived from the automatic setting of the voltage divider (matrix) $M_{A_1}$ and a lead line 554 which provides a voltage derived from the automatic setting of the voltage divider (matrix) $M_{B_1}$. These lead lines feed signals to three rectifying doublers $D_1$ (FIG. 4D) (for the lead line 552), $D_2$ (for the lead line 554) and $D_3$ (for the lead line 556) which rectify the alternating current outputs of the equivalent (matrix) potentiometers or manual potentiometer. Cooperating with these three rectifying doublers is a fourth rectifying doubler $D_4$.

Circuit connections are provided to connect the rectifying doubler $D_4$ either with the matrix doublers $D_1$, $D_2$ or the manual doubler $D_3$ in order to form a full wave rectifying bridge. Said circuit means constitute in part the pairs of contacts of the relay $RY_{e_1}$. This relay has a pair of normally closed contacts $1_{e_1}$, a pair of normally open contacts $2_{e_1}$, a pair of normally closed contacts $3_{e_1}$ and a pair of normally open contacts $4_{e_1}$. A common end of the two matrix rectifying doublers $D_1$, $D_2$ is connected by a lead line 558 to the normally closed pair of contacts $3_{e_1}$, these contacts being connected by a lead line 560 to a first end of the rectifying doubler $D_4$. The other end of the rectifying doubler $D_4$ is connected by a lead line 562 and the normally closed pair of contacts $1_{e_1}$ to the other common end of the doublers $D_1$, $D_2$ so that as long as the relay $RY_{e_1}$ is unenergized, the output from the full wave rectifier bridge will be a function of the A.C. voltage fed to one or the other of the rectifying doublers $D_1$, $D_2$ from one or the other matrices of the individual control circuit, it being understood that only one of these will be fed at a time at any given extreme position of the fader handle 158 (FIGS. 4E and 6), since at this time only one of the primaries of the isolation transformers $TR_d$, $TR_e$ (FIG. 4E) will be energized.

When the relay $RY_{e_1}$ (FIG. 4D) is energized, the doublers $D_1$, $D_2$ are disconnected from he doubler $D_4$ and instead the doubler $D_3$ is conneced to the doubler $D_4$ through the now closed contacts $2_{e_1}$, $4_{e_1}$ and the lead lines 560, 562. The relay $RY_{e_1}$ can be energized either by shifting the switch $SW_{m_1}$ (FIG. 4C) to its number 3 position or by energizing the relay $RY_1$ (FIG. 4B) (either the "standby" or "record" network section in operation).

The output from our control system is at the terminals 564, 566 (FIG. 4D), the terminal 564 being connected by lead wire 563 directly to one end of the doubler $D_4$ and the terminal 566 being connected through normally closed contacts $1_f$ of the relay $RY_{f_1}$ and lead wire 565 to the other end of the doubler, whereby energization of the relay $RY_{f_1}$ opens the feed to the output terminals and through the pair of contacts $2_f$ shorts these terminals through the resistor 568. It will be apparent that a D.C. signal thus is fed to the output terminals, the amplitude of which signal will be a function either of the voltage appearing on the lead line 556, the voltage appearing on the lead line 552, or the voltage appearing on the lead line 554, providing, of course, that the fader handle is at one of its extreme positions.

The terminals 564, 566 are adapted to be connected to an individual power unit, there being one power unit for each of the individual control circuits and there being one pair of terminals 564, 566 for each of the individual control circuits. By way of example, the control terminals 564, 566 can be connected to the blades of the selector switches 48 of the circuit shown in FIG. 1 of United States Letters Patent No. 2,798,984 for Lighting Control Circuits. The D.C. signal output of our present circuit thereby controls an individual A.C. power unit which feeds a lighting load associated with the particular individual control circuit under the regulation of the potentiometer $P_1$ (FIGS. 4C and 11) or one of the other of the matrices $M_{A_1}$, $M_{B_1}$ (FIG. 4F).

The value of the voltage appearing across the output terminals 564, 566 (FIG. 4D) of any one of the individual control circuits can always be readily ascertained, this being desirable for example when an operator wishes to determine the position of a potentiometer $P_1 \ldots$ (FIG. 4C) corresponding to the setting of a relay matrix $M_{A \text{ or } B_1} \ldots$ (FIG. 4F). The means to determine this voltage constitutes a meter M (FIG. 4D) which can be connected to any pair of output terminals 564, 566 by a two-pole multi-position switch $SW_n$ having plural pairs of contacts engageable with a pair of jointly rotatable arms 569, 570. Each pair of contacts is connected by lead lines 572, 574 to a corresponding pair of output terminals 564, 566, and the arms 569, 570 are connected by a pair of lead lines 576, 578 to a voltmeter which constitutes the meter M. It will be apparent that when the arms are on any given pair of contacts, the meter will register the voltage output of the terminals. The scale of the meter is graduated in thirty-two readings corresponding to the thirty-two discrete voltage outputs obtainable from the translator relay matrices and corresponding to the thirty-two positions denoted on the indicator drum 170 (FIG. 11).

It will be appreciated that manipulation of the individual circuit selection switch $SW_{m_1}$ (FIG. 4C) and of the function push buttons 132, 134, 136, 138 (FIGS. 4A and 6) will determine which control output will appear on the terminals 564, 566 (FIG. 4D). Thus, if the switch $SW_{m_1}$ is in number 2 (automatic) position and either the read or duplicate push button was the last depressed, there will be no power fed to the relay $RY_{e_1}$ (FIG. 4D) so that the contacts $1_{e_1}$ and $3_{e_1}$ will be closed, thereby placing the doublers $D_1$, $D_2$ in the individual output circuit. These are the doublers which are fed from the matrices so that the system then is in storage memory operation. When the switch $SW_{m_1}$ is moved to number 1 position, and the "duplicate" push button is activated, the relays $RY_{b_1}$ (FIG. 4C) and the relays that operate the card punch and card reader are energized. Accordingly, when the relay $RY_{d_1}$ is actuated during scanning while the relay $RY_{a_1}$ is energized, the code signals fed to the card punch will originate from the switch $SW_{p_1}$ instead of from the card reader. When the switch $SW_{m_1}$ is thrown to its number 3 position, the relay $RY_{e_1}$ (FIG. 4D) is energized, thereby bringing the manual potentiometer $P_1$ (FIGS. 4C and 11) into the circuit so that its output is rectified and fed to the terminals 564, 566 (FIG. 4D). When the switch $SW_{m_1}$ is moved to its number 4 position, the relay $RY_{f_1}$ is energized to disconnect the full wave rectifier from the circuit output terminals.

Briefly, reviewing the operations of our system, depressing the "stand-by" button 132 (FIGS. 4A and 6) (a) energizes the relays $RY_{e_1} \ldots$ (FIG. 4D) to place all of the system under control of the potentiometers $P_1 \ldots$ (FIG. 4C), and (b) energizes the relays $RY_{b_1} \ldots$ to connect the switches $SW_{p_1} \ldots$ to one of each set of relay translator matrices and to the contacts of the relays $RY_{d_1} \ldots$. At such time the several lighting loads can be regulated by the operator through operation of the potentiometer wiper arms 164 (FIG. 11) which operate the potentiometers $P_1 \ldots$.

Assuming that all of the loads are in proper position, the operator pushes the "record" button 134 (FIGS. 4A and 6) and then the card button 140. Pushing the "record" button leaves the system under manual control, but, by closure of the pair of contacts $1_m$ (FIG. 4A) energizes the card punch motor 64 (FIG. 8). It also brings power to the switch $SW_e$ (FIG. 4A) controlled by the button 140. When the button 140 is depressed, it starts operation of the stepping switch $SW_1$ (FIG. 4B). As the arm 418 of the switch scans over its successive contacts, it will successively energize the relays $RY_{d_1} \ldots$ (FIG. 4C) to feed to the solenoids of the card punch the coded digital signals derived from the encoding switches $SW_{p_1} \ldots$ of the successive individual potentiometers $P_1 \ldots$ so that cards will be punched in a binary code corresponding to the analog positions of the sundry individual manual control potentiometers. After all of the said switches $SW_{p_1} \ldots$ have been scanned and the information recorded, the card punch is cycled by the arm 418 touching on the last from the home contact and the switch $SW_1$ finally will come to rest.

Depression of the "duplicate" button 136 (FIGS. 4A and 6) will set both the card reader and card punch into operation. Signals from the card reader will be fed to the different individual relay matrices and said signals are scanned in turn by the action of the switch $SW_1$ (FIG. 4B) and fed to the card punch, except for those individual circuits in which the switch $SW_{m_1}$ (FIG. 4C) is in number 1 position. In those circuits the signals controlling the associated rows of the card punch will be read from the switches $SW_{p_1} \ldots$.

Depressing the "read" button energizes the card reader and sets up the card reader cycling circuit. Cycle pulses will be fed to the reader as the fader handle is moved from one extreme position to the other. These cycle pulses are initiated by intermittent energization and de-energization of the relay $RY_r$ (FIG. 4E) through the limit switches $LS_1$ and $LS_2$ that are mechanically actuated by the fader handle 158, so that each time the fader handle reaches either limit of its travel the relay $RY_r$ is either energized or de-energized, causing a reversal of the conditions of the pairs of contacts $1_x$, $2_x$ (FIG. 4D), which engenders a cycle pulse that is fed to the card reader. This causes the signals to be read from the punched card into the relays of the translator relay matrices which at that moment are not in control of the full wave rectifiers because they are not energized by the autotransformer $TR_a$ (FIG. 4E). Subsequent movement of the fader handle to its other extreme position smoothly transfers power to all the individual translator relay matrices which previously were set up by the punched card and causes the next punched card to set up the then idle other relay translator matrices.

It thus will be seen that we have provided a lighting control circuit which achieves the various objects of our invention and is well adapted to meet the conditions of practical use.

As various possible embodiments might be made of the above invention and as various changes might be made in the embodiments above set forth, it is to be understood that all matter herein described or shown in the accompanying drawings is to be interpreted as illustrative and not in a limiting sense.

Having thus described our invention, we claim as new and desire to secure by Letters Patent:

1. In a lighting control system for controlling a number of individual lighting loads, a memory storage, plural means for supplying variable voltages, each said means including a manually manipulatable means for varying the voltage, plural means for encoding the positions of said manually manipulatable means into binary signals, and means for inscribing the signals into the memory storage, said last named means scanning the encoding means sequentially for inscribing signals into the memory storage.

2. In a lighting control system for controlling a number of individual lighting loads, a memory storage containing successive memories, a plurality of individual electrical networks, each of said loads having associated therewith at least two different networks, each network including a plurality of electrical elements, and each network further including a plurality of relays for selectively controlling said elements, means for selectively operating the relays of different networks from successive memories in the memory storage, and means for holding the relays of one network of a load while the relays of another network of the same load are selectively operated from the memory storage.

3. In a lighting control system for controlling a number of individual lighting loads, a different manually manipulatable voltage divider for each different individual load, a different encoding means for each different voltage divider to provide a code signal corresponding to the position of the associated voltage divider, a different translator relay matrix for each different individual load, each matrix constituting plural impedances and relays operable to change the connections of the impedances so that the matrix functions as a variable voltage divider, a different output terminal for each different individual load, switch means for selectively connecting to the output terminal of each load either the output from the manually manipulatable voltage divider or from the matrix voltage divider, and a stand-by network circuit section including switch and relay means for operatively connecting to the output terminals for all the individual loads the outputs from the manually manipulatable voltage divider output, and for connecting the encoding means for all the individual loads to the relays of the translator relay matrices.

4. In a lighting control system for controlling a number of individual lighting loads, a memory storage means, means for inscribing coded information in said memory storage means, means for reading coded information out of said memory storage means, a different means for manually individually controlling each different load, a different means for encoding the position of each different manual controlling means for inscription in the memory storage means, a different temporary memory storage means for each different load operable by signals from the read-out means, means for selectively controlling each different individual load from the associated temporary memory storage means or the associated manual controlling means, and plural function network sections for effecting selectively different connections between the aforesaid means, each of said sections including a holding means to maintain said section energized when once energized, and each of said sections further including cut-out means for cutting out the holding means of other sections when any particular section is energized.

5. In a lighting control system for controlling a number of individual lighting loads, a different manually manipulatable voltage divider for each different individual load, a different encoding means for each different voltage divider to provide a code signal corresponding to the position of said voltage divider, a different output terminal for each different individual load, a code signal operated card punch, and a read network section including switch and relay means for reading plural selected encoding means into the card punch while maintaining the associated voltage dividers connected to the output terminals.

6. A combination as set forth in claim 5 wherein means is included to prepare the card punch for inscription of code signals by the encoding means, and there further is included a manually manipulatable means and a switch controlled thereby for cycling the card punch after the signals have been read into the punch.

7. In a lighting control system for controlling a number of individual lighting loads, a memory storage, means for reading signals into said memory storage, means for reading signals out of said memory storage, a different individual circuit for each different individual load, circuit means connecting the read-out means with the read-in means, and different means associated with each different individual circuit for selectively superimposing on the circuit-connecting means signals singular to the individual circuit.

8. In a lighting control system for controlling a number of individual lighting loads, a memory storage, means for reading information out of said memory storage, a different group of temporary memory storages for controlling each different individual load, means alternately connecting the read-out means with alternate temporary memory storages of selected different individual loads, means to prepare the read-out means for operation, said read-out means having a cycling terminal, circuit means to apply an actuating pulse to said cycling terminal, and means to intermittently energize said last named circuit means.

9. In a lighting control system for controlling a number of individual lighting loads, a different individual circuit for each different individual load, each individual circuit including a manually manipulatable means for controlling the associated individual load, means for encoding the position of the manually manipulatable means into an electric signal, a temporary memory storage, an output terminal and switching means for selectively connecting to the output terminal the output from the manually manipulatable means or the temporary memory storage, and an overall control circuit including a memory storage, means for reading signals into the memory storage, means for reading signals out of the memory storage, and selectively operable plural function network sections for connecting selected encoding means to the read-in means, for connecting the read-out means to selected temporary memory storages, or for connecting the read-out means to the read-in means.

10. In a lighting control system for controlling a number of individual lighting loads wherein there is an overall control circuit including means for reading information into a memory storage and means for reading information out of the memory storage: a different individual circuit for each different individual load, each circuit including an output terminal for connection to an associated individual load, a temporary memory storage, a manually manipulatable voltage divider, encoding means responsive to the position of the voltage divider, and selective switching means for connecting the temporary memory storage to the output terminal, the read-out means to the temporary memory storage and the encoding means to the read-in means, or for connecting the voltage divider to the output terminal.

11. In a lighting control system for controlling a number of individual lighting loads, a memory storage constituting a plurality of discrete units, means to inscribe code signals on said units in succession, said inscribing means being actuated responsive to a pulse, a different manually manipulatable means for controlling each different load, a different encoding means providing code signals responsive to the position of each different manually manipulatable means, means for feeding code signals from plural encoding means to said inscribing means and for automatically supplying a pulse to said inscribing means, and manually manipulatable means for supplying such a pulse independently of said feeding means whereby to actuate said inscribing means without feeding code signals thereto.

12. In a lighting control system for controlling a number of individual lighting loads, a memory storage, a different manually manipulatable means for individually controlling each different individual load, a different means for encoding into electric signals the positions of different manually manipulatable means, means for inscribing said signals in the memory storage, a different pair of temporary memory storages associated with each different load, means to selectively control each different load from the associated manually manipulatable means or the associated temporary memory storages, and a crossover network for selectively connecting the encoding means to the inscribing means, or for feeding memories from the memory storage to alternate ones of the pairs of temporary memory storages, or for feeding memories from the memory storage to the inscribing means.

13. In a lighting control system for controlling a number of individual lighting loads, a memory storage, a different manually manipulatable means for individually controlling each different individual load, a different means for encoding into electric signals the positions of different manually manipulatable means, means for inscribing said signals in the memory storage, a different pair of temporary memory storages associated with each different load, means to selectively control each different load from the associated manually manipulatable means or the associated temporary memory storages, and a crossover network for selectively connecting the encoding means to the inscribing means, or for feeding memories from the memory storage to alternate ones of the pairs of temporary memory storages, or for feeding memories from the memory storage to the inscribing means, or for connecting selected encoding means to associated pairs of temporary memory storages.

14. In a lighting control system for controlling a number of individual lighting loads from a coded memory system containing successive memories for providing coded output signals, plural electrical networks associated with each of said loads and adapted to be regulated in succession by successive memories, each said network including two series connected identical groups of series connected resistors, means connecting an output voltage source across both groups of resistors, means connecting the voltage across one of said groups to a control circuit for a lighting load, and means selectively shunting one or the other of each pair of identical resistors in the two groups in response to said coded output signals.

15. In a lighting control system for controlling a number of individual lighting loads from a coded memory system containing successive memories for providing coded output signals, plural electrical networks associated with each of said loads and adapted to be regulated in succession by successive memories, each said network including two series connected identical groups of $n$ series connected resistors, where $n$ is an integral number greater than 1, the resistors of each series having different resistance values, means connecting an output voltage source across both groups of resistors, means connecting the voltage across one of said groups to a control circuit for a lighting load, and means selectively shunting one or the other of each pair of identical resistors in the two groups in response to said coded output signals.

16. In a lighting control system for controlling a number of individual lighting loads from a coded memory system containing successive memories for providing coded output signals, plural electrical networks associated with each of said loads and adapted to be regulated in succession by successive memories, each said network including two series connected identical groups of $n$ series connected resistors, where $n$ is an integral number greater than 1, the resistors of each series having values equal to $x \cdot 2^{0,1,2 \cdots n-1}$, where $x$ is the least resistance value of any of said resistors, means connecting an output voltage source across both groups of resistors, means connecting the voltage across one of said groups to a control circuit for a lighting load, and means selectively shunting one or the other of each pair of identical resistors in the two groups in response to said coded output signals.

17. In a lighting control system for controlling a number of individual lighting loads from a coded memory system containing successive memories for providing coded output signals, plural electrical networks associated with each of said loads and adapted to be regulated in succession by successive memories, each said network including two series connected identical groups of series connected resistors, means connecting an output voltage source across both groups of resistors, means connecting the voltage across one of said groups to a control circuit for a lighting load, and plural relay means each connected to selectively shunt one or the other of each pair of identical resistors in the two groups in response to said coded output signals.

References Cited by the Examiner

UNITED STATES PATENTS

| | | | |
|---|---|---|---|
| 2,573,405 | 10/1951 | Clark | 315—292 |
| 2,642,553 | 6/1953 | Williams | 315—292 |
| 2,781,848 | 2/1957 | Madden et al. | 234—121 X |
| 2,783,464 | 2/1957 | Canepa | 340—347 |
| 2,866,184 | 12/1958 | Gray | 340—347 |
| 2,994,804 | 8/1961 | Skirpan | 315—297 X |
| 3,004,193 | 10/1961 | Bentham et al. | 315—295 |
| 3,060,347 | 10/1962 | Burski | 315—316 |
| 3,157,821 | 11/1964 | Passmore et al. | 315—316 X |

JOHN W. HUCKERT, *Primary Examiner.*

EVERETT R. REYNOLDS, GEORGE N. WESTBY, ARTHUR GAUSS, DAVID J. GALVIN, *Examiners.*